United States Patent
Elshafie et al.

(10) Patent No.: US 11,706,743 B2
(45) Date of Patent: Jul. 18, 2023

(54) MIXED FORMAT TECHNIQUES FOR ORPHANED SYMBOLS IN UPLINK CHANNEL REPETITIONS

(71) Applicant: QUALCOMM incorporated, San Diego, CA (US)

(72) Inventors: Ahmed Elshafie, San Diego, CA (US); Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/488,085

(22) Filed: Sep. 28, 2021

(65) Prior Publication Data

US 2022/0110115 A1 Apr. 7, 2022

Related U.S. Application Data

(60) Provisional application No. 63/087,708, filed on Oct. 5, 2020.

(51) Int. Cl.
| | |
|---|---|
| *H04W 72/04* | (2023.01) |
| *H04W 72/23* | (2023.01) |
| *H04L 5/00* | (2006.01) |
| *H04L 1/16* | (2023.01) |
| *H04W 72/0446* | (2023.01) |
| *H04L 1/1607* | (2023.01) |

(52) U.S. Cl.
CPC ....... *H04W 72/0446* (2013.01); *H04L 1/1642* (2013.01); *H04L 1/1678* (2013.01); *H04L 5/0051* (2013.01); *H04W 72/23* (2023.01)

(58) Field of Classification Search
CPC ........... H04W 72/0446; H04W 72/042; H04L 1/1642; H04L 1/1678; H04L 5/0051
See application file for complete search history.

(56) References Cited

U.S. PATENT DOCUMENTS

2020/0314875 A1* 10/2020 Fakoorian ........... H04L 27/2602
2021/0360616 A1* 11/2021 Yi ..................... H04W 72/0413

* cited by examiner

*Primary Examiner* — Ronald B Abelson
(74) *Attorney, Agent, or Firm* — Holland & Hart LLP

(57) ABSTRACT

Methods, systems, and devices for wireless communications are described. A user equipment (UE) receives, from a base station, an indication of a configuration for symbol repetition, the configuration including one or more parameters for transmitting a message on a physical uplink channel. The UE formats, based on a first format of the configuration, a first portion of a set of repetitions of the message scheduled for transmission before a slot boundary, and formats, based on a second format of the configuration, a second portion of the set of repetitions of the message scheduled for transmission after the slot boundary, the second portion being a single symbol. The UE transmits, to the base station, the first portion of the set of repetitions formatted according to the first format and the second portion of the set of repetitions according to the second format.

28 Claims, 18 Drawing Sheets

MIXED FORMAT TECHNIQUES FOR ORPHANED SYMBOLS IN UPLINK CHANNEL REPETITIONS

CROSS REFERENCE

The present Application for Patent claims the benefit of U.S. Provisional Patent Application No. 63/087,708 by ELSHAFIE et al., entitled "MIXED FORMAT TECHNIQUES FOR ORPHANED SYMBOLS IN UPLINK CHANNEL REPETITIONS," filed Oct. 5, 2020, assigned to the assignee hereof, and expressly incorporated by reference herein.

FIELD OF TECHNOLOGY

The following relates to wireless communications, including mixed format techniques for orphaned symbols in uplink channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Some wireless systems may support communications between a UE and a base station. Communications between the UE and base station may involve a series of messages between the UE and the base station. In some cases, it may be desirable to improve the throughput associated with the communications.

The described techniques relate to improved methods, systems, devices, and apparatuses that support mixed format techniques for orphaned symbols (e.g., a single symbol after a transmission time interval boundary, such as a slot boundary) related to uplink channel repetitions. Generally, a user equipment (UE) may receive configuration information for mixed format techniques for orphaned symbols in uplink channel repetitions. The UE may format a first portion of a set of repetitions of a message based on a first format of the configuration and a second portion of the set of repetitions of the message based on a second format of the configuration, where the second portion of the set of repetitions is a single symbol (e.g., an orphan symbol, a symbol after a transmission time interval boundary, such as a slot boundary). The UE may then transmit to the base station the first portion according to the first format and the second portion according to the second format.

A method of wireless communication by a UE is described. The method may include receiving, from a base station, an indication of a configuration for symbol repetition, the configuration including one or more parameters for transmitting a message on a physical uplink channel, formatting, based on a first format indicated by the indication of the configuration, a first portion of a set of repetitions of the message scheduled for transmission before a slot boundary, and based on a second format indicated by the indication of the configuration, a second portion of the set of repetitions of the message scheduled for transmission after the slot boundary, where the second portion of the set of repetitions is a single symbol, and transmitting, to the base station, the first portion of the set of repetitions formatted according to the first format and the second portion of the set of repetitions according to the second format.

An apparatus for wireless communication by a UE is described. The apparatus may include a processor, memory coupled with the processor, and instructions stored in the memory. The instructions may be executable by the processor to cause the apparatus to receive, from a base station, an indication of a configuration for symbol repetition, the configuration including one or more parameters for transmitting a message on a physical uplink channel, format, based on a first format indicated by the indication of the configuration, a first portion of a set of repetitions of the message scheduled for transmission before a slot boundary, and based on a second format indicated by the indication of the configuration, a second portion of the set of repetitions of the message scheduled for transmission after the slot boundary, where the second portion of the set of repetitions is a single symbol, and transmit, to the base station, the first portion of the set of repetitions formatted according to the first format and the second portion of the set of repetitions according to the second format.

Another apparatus for wireless communication by a UE is described. The apparatus may include means for receiving, from a base station, an indication of a configuration for symbol repetition, the configuration including one or more parameters for transmitting a message on a physical uplink channel, formatting, based on a first format indicated by the indication of the configuration, a first portion of a set of repetitions of the message scheduled for transmission before a slot boundary, and based on a second format indicated by the indication of the configuration, a second portion of the set of repetitions of the message scheduled for transmission after the slot boundary, where the second portion of the set of repetitions is a single symbol, and transmitting, to the base station, the first portion of the set of repetitions formatted according to the first format and the second portion of the set of repetitions according to the second format.

A non-transitory computer-readable medium storing code for wireless communication by a UE is described. The code may include instructions executable by a processor to receive, from a base station, an indication of a configuration for symbol repetition, the configuration including one or more parameters for transmitting a message on a physical uplink channel, format, based on a first format indicated by the indication of the configuration, a first portion of a set of repetitions of the message scheduled for transmission before a slot boundary, and based on a second format indicated by the indication of the configuration, a second portion of the set of repetitions of the message scheduled for transmission after the slot boundary, where the second portion of the set of repetitions is a single symbol, and transmit, to the base station, the first portion of the set of repetitions formatted according to the first format and the second portion of the set of repetitions according to the second format.

Some examples of the method, apparatuses, and non-transitory computer-readable medium described herein may further include operations, features, means, or instructions for selecting the second format based on a number of bits supported by the first format, where formatting the second portion of the set of repetitions may be based on selecting the second format. In some examples of the method, apparatuses, and non-transitory computer-readable medium described herein, the second format may support sequence-based transmissions.

Some examples of the method, apparatuses, and non-transitory computer-readable medium described herein may further include operations, features, means, or instructions for selecting the second format based on the number of bits supported by the second format matching the number of bits supported by the first format, where formatting the second portion of the set of repetitions may be based on selecting the second format.

Some examples of the method, apparatuses, and non-transitory computer-readable medium described herein may further include operations, features, means, or instructions for selecting the second format based on the second format supporting a demodulation reference signal and data being encoded or multiplexed within a single symbol.

In some examples of the method, apparatuses, and non-transitory computer-readable medium described herein, selecting the second format may include operations, features, means, or instructions for selecting a modified physical uplink control channel format, where a number of bits supported by the modified physical uplink control channel format matches the number of bits supported by the first format.

In some examples of the method, apparatuses, and non-transitory computer-readable medium described herein, the number of bits supported by the first format and the second format may be 2 bits or less.

In some examples of the method, apparatuses, and non-transitory computer-readable medium described herein, the number of bits supported by the first format and the second format may be greater than 2 bits.

Some examples of the method, apparatuses, and non-transitory computer-readable medium described herein may further include operations, features, means, or instructions for selecting the second format based on a number of resource blocks supported by the first format.

Some examples of the method, apparatuses, and non-transitory computer-readable medium described herein may further include operations, features, means, or instructions for selecting the second format based on a number of resource blocks supported by the second format matching the number of resource blocks supported by the first format.

In some examples of the method, apparatuses, and non-transitory computer-readable medium described herein, selecting the second format may include operations, features, means, or instructions for selecting a modified physical uplink control channel format, where a number of resource blocks supported by the modified physical uplink control channel format matches the number of resource blocks supported by the first format, and where a number of bits supported by the modified physical uplink control channel format matches the number of bits supported by the first format.

In some examples of the method, apparatuses, and non-transitory computer-readable medium described herein, receiving the indication of the configuration may include operations, features, means, or instructions for receiving the indication of the configuration in a radio resource control message, or a media access control-control element message, or a downlink control information message, or any combination thereof.

In some examples of the method, apparatuses, and non-transitory computer-readable medium described herein, the first portion of the message includes two or more symbols.

In some examples of the method, apparatuses, and non-transitory computer-readable medium described herein, the physical uplink channel includes a physical uplink control channel.

In some examples of the method, apparatuses, and non-transitory computer-readable medium described herein, the first format includes a physical uplink control channel format 1 and the second format includes a physical uplink control channel format 0.

In some examples of the method, apparatuses, and non-transitory computer-readable medium described herein, the first format includes a physical uplink control channel format 1 and the second format includes a modified physical uplink control channel format 2.

In some examples of the method, apparatuses, and non-transitory computer-readable medium described herein, the first format includes a physical uplink control channel format 3 and the second format includes a modified physical uplink control channel format 0.

In some examples of the method, apparatuses, and non-transitory computer-readable medium described herein, the first format includes a physical uplink control channel format 3 and the second format includes a physical uplink control channel format 2.

In some examples of the method, apparatuses, and non-transitory computer-readable medium described herein, the first format includes a physical uplink control channel format 4 and the second format includes a modified physical uplink control channel format 0.

In some examples of the method, apparatuses, and non-transitory computer-readable medium described herein, the first format includes a physical uplink control channel format 4 and the second format includes a physical uplink control channel format 2.

In some examples of the method, apparatuses, and non-transitory computer-readable medium described herein, the one or more parameters include an indication of a number of repetitions, an indication of a length of the repetition, an indication of a starting symbol for the repetition, or any combination thereof.

A method of wireless communication by a base station is described. The method may include transmitting, to a UE, an indication of a configuration for symbol repetition, the configuration including one or more parameters for transmitting a message on a physical uplink channel, receiving, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol, and processing the first portion of the set of repetitions of the message according to the first format and the second portion of the set of repetitions of the message according to the second format.

An apparatus for wireless communication by a base station is described. The apparatus may include a processor, memory coupled with the processor, and instructions stored in the memory. The instructions may be executable by the processor to cause the apparatus to transmit, to a UE, an indication of a configuration for symbol repetition, the configuration including one or more parameters for transmitting a message on a physical uplink channel, receive, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol, and process the first portion of the set of repetitions of the message according to the first format and the second portion of the set of repetitions of the message according to the second format.

Another apparatus for wireless communication by a base station is described. The apparatus may include means for transmitting, to a UE, an indication of a configuration for symbol repetition, the configuration including one or more parameters for transmitting a message on a physical uplink channel, receiving, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol, and processing the first portion of the set of repetitions of the message according to the first format and the second portion of the set of repetitions of the message according to the second format.

A non-transitory computer-readable medium storing code for wireless communication by a base station is described. The code may include instructions executable by a processor to transmit, to a UE, an indication of a configuration for symbol repetition, the configuration including one or more parameters for transmitting a message on a physical uplink channel, receive, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol, and process the first portion of the set of repetitions of the message according to the first format and the second portion of the set of repetitions of the message according to the second format.

Some examples of the method, apparatuses, and non-transitory computer-readable medium described herein may further include operations, features, means, or instructions for indicating, via the indication of the configuration, a selection of the second format for the UE to use based on a number of bits supported by the first format. In some examples of the method, apparatuses, and non-transitory computer-readable medium described herein, the second format may support sequence-based transmissions.

Some examples of the method, apparatuses, and non-transitory computer-readable medium described herein may further include operations, features, means, or instructions for indicating, via the indication of the configuration, a selection of the second format for the UE to use based on the second format supporting a demodulation reference signal and data being encoded or multiplexed within a single symbol.

Some examples of the method, apparatuses, and non-transitory computer-readable medium described herein may further include operations, features, means, or instructions for indicating, via the indication of the configuration, a selection of the second format for the UE to use based on a number of bits supported by the second format matching the number of bits supported by the first format.

Some examples of the method, apparatuses, and non-transitory computer-readable medium described herein may further include operations, features, means, or instructions for indicating, via the indication of the configuration, a modified physical uplink control channel format, where a number of bits supported by the modified physical uplink control channel format matches the number of bits supported by the first format.

In some examples of the method, apparatuses, and non-transitory computer-readable medium described herein, the number of bits supported by the first format and the second format may be 2 bits or less.

In some examples of the method, apparatuses, and non-transitory computer-readable medium described herein, the number of bits supported by the first format and the second format may be greater than 2 bits.

Some examples of the method, apparatuses, and non-transitory computer-readable medium described herein may further include operations, features, means, or instructions for indicating, via the indication of the configuration, a selection of the second format for the UE to use based on a number of resource blocks supported by the first format.

Some examples of the method, apparatuses, and non-transitory computer-readable medium described herein may further include operations, features, means, or instructions for indicating, via the indication of the configuration, a selection of the second format for the UE to use based on a number of resource blocks supported by the second format matching the number of resource blocks supported by the first format.

Some examples of the method, apparatuses, and non-transitory computer-readable medium described herein may further include operations, features, means, or instructions for indicating, via the indication of the configuration, a modified physical uplink control channel format, where a number of resource blocks supported by the modified physical uplink control channel format matches the number of resource blocks supported by the first format, and where a number of bits supported by the modified physical uplink control channel format matches the number of bits supported by the first format.

In some examples of the method, apparatuses, and non-transitory computer-readable medium described herein, transmitting the indication of the configuration may include operations, features, means, or instructions for transmitting the configuration in a radio resource control message, or a media access control-control element message, or a downlink control information message, or any combination thereof.

In some examples of the method, apparatuses, and non-transitory computer-readable medium described herein, the first portion of the message includes two or more symbols.

In some examples of the method, apparatuses, and non-transitory computer-readable medium described herein, the physical uplink channel includes a physical uplink control channel.

In some examples of the method, apparatuses, and non-transitory computer-readable medium described herein, the first format includes a physical uplink control channel format 1 and the second format includes a physical uplink control channel format 0.

In some examples of the method, apparatuses, and non-transitory computer-readable medium described herein, the first format includes a physical uplink control channel format 1 and the second format includes a modified physical uplink control channel format 2.

In some examples of the method, apparatuses, and non-transitory computer-readable medium described herein, the first format includes a physical uplink control channel format 3 and the second format includes a modified physical uplink control channel format 0.

In some examples of the method, apparatuses, and non-transitory computer-readable medium described herein, the first format includes a physical uplink control channel format 3 and the second format includes a physical uplink control channel format 2.

In some examples of the method, apparatuses, and non-transitory computer-readable medium described herein, the first format includes a physical uplink control channel format 4 and the second format includes a modified physical uplink control channel format 0.

In some examples of the method, apparatuses, and non-transitory computer-readable medium described herein, the first format includes a physical uplink control channel format 4 and the second format includes a physical uplink control channel format 2.

In some examples of the method, apparatuses, and non-transitory computer-readable medium described herein, the one or more parameters include an indication of a number of repetitions, an indication of a length of the repetition, an indication of a starting symbol for the repetition, or any combination thereof.

DETAILED DESCRIPTION

Figure 1:
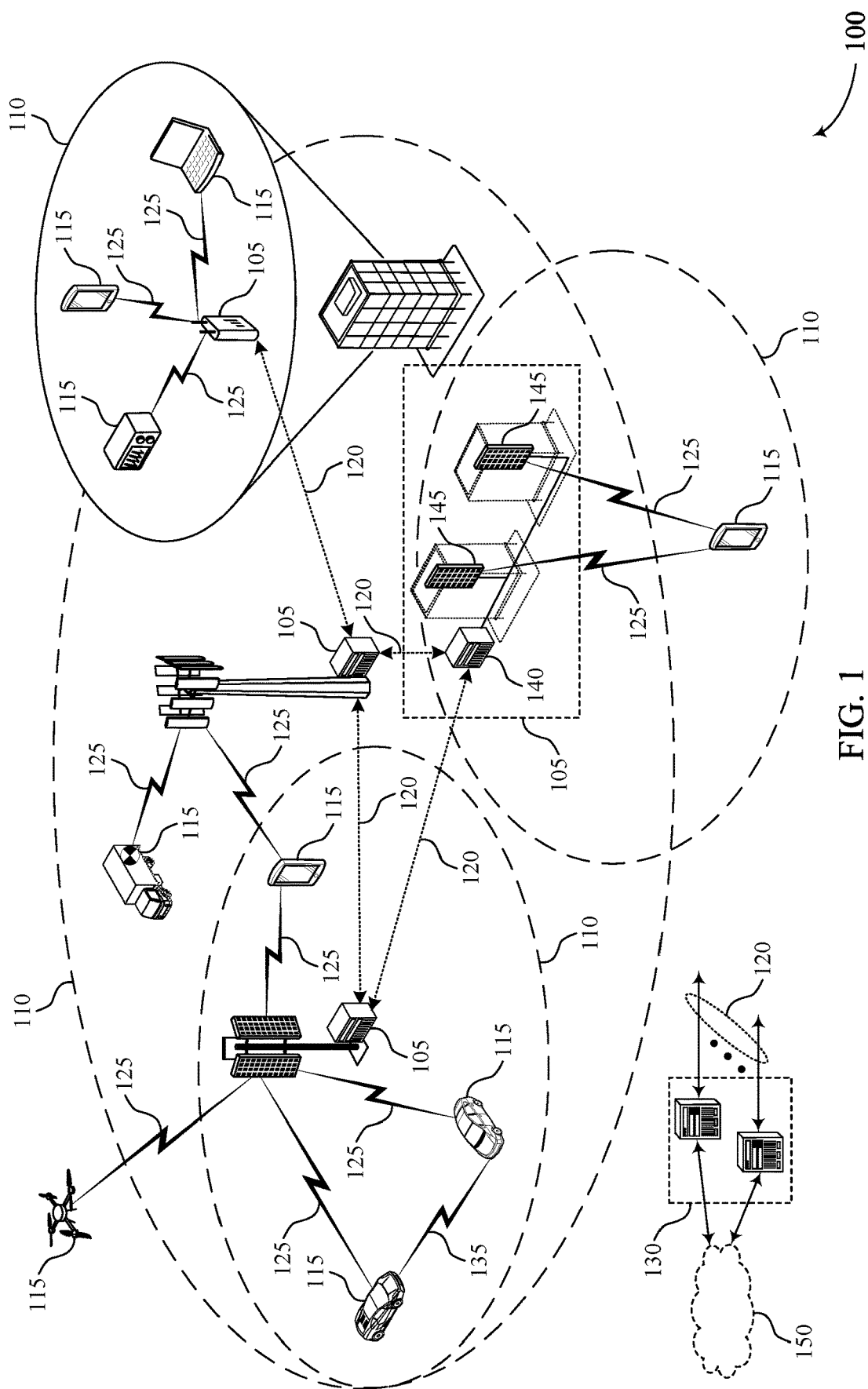
FIG. 1 illustrates an example of a system for wireless communications that supports mixed format techniques for orphaned symbols in uplink channel repetitions in accordance with aspects of the present disclosure.

Some wireless communications systems may support uplink channel repetitions, such as physical uplink control channel (PUCCH) repetitions (e.g., PUCCH repetition type A, PUCCH repetition type B). In such cases, a base station may configure a user equipment (UE) to transmit repetitions (e.g., X symbols) of a message on a physical uplink channel (e.g., PUSCH or PUCCH). In such examples, the UE may configure one or more repetitions in a message.

In some cases, the repetitions for the message may span across a transmission interval time boundary, such as a slot-boundary, breaking the repetitions of the message into two or more segments (e.g., subsets) of the repetitions (e.g., two or more separate actual repetitions). In some cases, one or more downlink (DL) symbols or invalid symbols may occur among the repetitions of a message, which also may break the repetitions of the message into two or more segments of the repetitions. Thus, a first portion of the repetitions may be scheduled for transmission before a transmission time interval boundary, such as a slot boundary (or DL symbol, or an invalid symbol), for example, and a second portion of the repetitions may be scheduled for transmission after the transmission time interval boundary, such as the slot boundary (or a DL symbol, or an invalid symbol).

In some cases, the break in the repetitions may result in a single symbol (e.g., one orphaned symbol) remaining after the break (e.g., after the slot boundary). In some examples, repetitions of a message may include X symbols (e.g., a symbol repeated X times). In some cases, one of those X symbols of the repetitions of the message may be orphaned after the break. When the repetitions of the message include 10 repetitions, for example, and the slot boundary occurs directly after 9 repetitions, then the first portion of the repetitions would include the first 9 repetitions and the second portion would include the 1 remaining repetition (e.g., 1 remaining symbol). When the repetitions of the message include 10 repetitions, for example, and a DL symbol or invalid symbol may occur after 8 repetitions, then the first portion of the repetitions would include the first 8 repetitions, followed by a DL symbol or invalid symbol, which may then be followed by the second portion that would include the 1 remaining repetition (e.g., 1 remaining orphaned symbol).

In some cases, the same format that is used on the first portion may be used on the second portion. However, the format used for the set of repetitions of the message may include a constraint (e.g., a parameter limitation or condition to be used for one or more operations) to use more than 1 symbol (e.g., constraint of using 4-14 symbols for PUCCH Formats 1, 3, and 4, constraint of using multiple symbols). Thus, the first portion of the set of repetitions may be constrained to use more than 1 symbol according to a format of the first portion, and because the format used on the first portion may otherwise apply to the second portion, the second portion may also be constrained to use more than 1 symbol independent of the number of symbols in the first portion or the second portion. But when the second portion includes a single repetition (e.g., a single symbol) after the break, the UE may be unable to transmit data/control information in that single remaining symbol due to a mismatch between a constraint of the format used on the first portion (e.g., to use more than 1 symbol) and the number of symbols available in the second portion (e.g., 1 symbol). Accordingly, the UE may drop or skip the orphaned symbol because of the UE being configured to use the format of the first portion on the second portion, but the format includes a constraint to use more than 1 symbol and the second portion of the set of repetitions includes 1 symbol.

Using a second format for the second portion of a set of repetitions may avoid the UE dropping or skipping the orphaned symbol. In some examples, when a break in a set of repetitions of a message occurs between the second to last symbol and the last symbol of the set of repetitions, a first format may be used on the first portion of the set of repetitions and a second format, i.e., different than the first format, may be used on the last symbol of the second portion of the set of repetitions. In some examples, the second format may support or be used for sequence-based transmissions (e.g., without a demodulation reference signal (DMRS) or transmissions without a DMRS-based structure). In some cases, the first format may support or be used for DMRS-based transmissions, and the second format may not support DMRS-based transmissions.

In some cases, an unmodified version of the second format may be used on the last symbol. In some cases, an unmodified version of the second format may be used when the number of bits that are used in the first format is within a range of the number of bits that may be used in the second format (e.g., according to a constraint of the second format). In some cases, an unmodified version of the second format may be used when the number of resource blocks that are used in the first format is within a range of or equal to the number of resource blocks that may be used in the second format (e.g., according to a constraint of the second format).

In some cases, a modified version of the second format may be used on the last symbol. The modified version of the second format may include a modified number of bits that may be used in the second format, or a modified number of resource blocks that may be used in the second format, or both. In some cases, according to the modified or unmodified second format, the UE sets the number of bits that are used on the second portion (e.g., the orphaned symbol) to match the number of bits that are used on the first portion according to the first format. In some cases, according to the modified or unmodified second format, the UE sets the number of resource blocks that are used on the second portion (e.g., the orphaned symbol) to match the number of resource blocks that are used on the first portion according to the first format.

In some cases, a base station may signal a configuration for repetition to a UE. In some cases, the configuration may indicate a process for orphaned symbols. In some cases, the configuration may indicate one or more formats to use for various symbols, including, but not limited to, orphaned symbols (e.g., a second format for the orphaned symbol, a second format to use on the second portion based on the first format used on the first format). In some cases, the configuration may indicate to drop or skip an orphaned symbol.

Thus, the present techniques improve resource usage efficiency when a break in the repetitions of a message occurs between the second to last symbol and the last symbol of the repetitions of the message, leaving a single orphaned symbol in a second portion of the repetitions of the message. When a break in the repetitions of a message occurs between the second to last symbol and the last symbol of the repetitions of the message, the first format may be used on the first portion of the repetitions and a second format may be used on the last symbol of the second portion of the repetitions.

Particular aspects of the subject matter described herein may be implemented to realize one or more advantages. The described techniques may support improvements in system efficiency such that a device may improve resource usage by avoiding symbols (e.g., orphaned symbols) being discarded or otherwise being sub-optimally used. Additionally, described techniques may result in avoiding multiple retransmissions and failed transmissions, decreases in system latency, improving the reliability of a decoding procedure for uplink transmissions at a base station, and improving user experience.

Aspects of the disclosure are initially described in the context of wireless communications systems. Aspects of the disclosure are further illustrated by and described with reference to physical uplink channel configurations and process flows. Aspects of the disclosure are further illustrated by and described with reference to apparatus diagrams, system diagrams, and flowcharts that relate to mixed format techniques for orphaned symbols in uplink channel repetitions.

Aspects of the disclosure are initially described in the context of wireless communications systems. Aspects of the disclosure are further illustrated by and described with reference to physical uplink channel configurations and process flows that relate to mixed format techniques for orphaned symbols in uplink channel repetitions. Aspects of the disclosure are further illustrated by and described with reference to apparatus diagrams, system diagrams, and flowcharts that relate to mixed format techniques for orphaned symbols in uplink channel repetitions.

FIG. 1 illustrates an example of a wireless communications system 100 that supports mixed format techniques for orphaned symbols in uplink channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical)

communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE 115 may receive (e.g., from a base station 105) an indication of a configuration for symbol repetition, where the configuration includes one or more parameters for transmitting a message on a physical uplink channel. The configuration may indicate a configuration for mixed format techniques for orphaned symbols in uplink channel repetitions. In some cases, a first portion of a set of repetitions of the message may be scheduled for transmission before a slot boundary and a second portion of the set of repetitions of the message may be scheduled for transmission after the slot boundary. The UE 115 may format the first portion of the set of repetitions of the message based on a first format indicated by the indication of the configuration and the second portion of the set of repetitions of the message based on a second format indicated by the configuration. In some cases, the second portion of the set of repetitions may include a single symbol. In some cases, the UE 115 may transmit (e.g., to a base station 105) the first portion of the set of repetitions formatted according to the first format and the second portion of the set of repetitions according to the second format.

Figure 2:
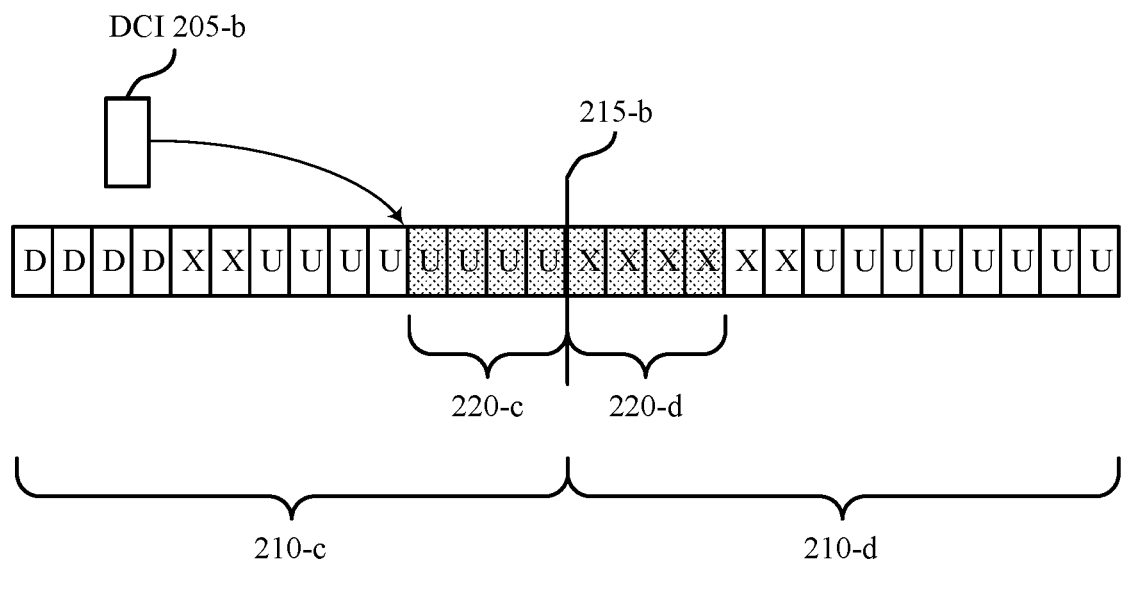
FIG. 2 illustrates an example of a physical uplink channel configuration that supports mixed format techniques for orphaned symbols in uplink channel repetitions in accordance with aspects of the present disclosure.

FIG. 2 illustrates an example of a physical uplink channel configuration 200 that supports mixed format techniques for orphaned symbols in uplink channel repetitions in accordance with aspects of the present disclosure. In some examples, physical uplink channel configuration 200 may be implemented by or may implement aspects of wireless communications system 100. For instance, a UE 115 may communicate with a base station 105 according to physical uplink channel configurations 200, and the UE 115 and the base station 105 may be examples of corresponding devices described with reference to FIG. 1.

Physical uplink channel configuration 200 may support physical uplink channel repetition type A (e.g., PUSCH repetitions type A or PUCCH repetitions type A). Physical uplink channel configuration 200 may support physical uplink channel repetition type B (e.g., PUSCH repetitions type B or PUCCH repetitions type B).

In some examples, a wireless communications system may support a physical uplink channel repetition configuration. Such configurations may support both dynamic grants and configured grants. In some examples, a base station 105 may transmit an uplink grant (e.g., via downlink control information (DCI)) triggering an uplink transmission. Base station 105 may also dynamically indicate configuration information for a number of repetitions of an uplink message. For instance, the DCI may include an indication of a starting symbol (S) for a first repetition (e.g., in each slot), a length (L) of each repetition (e.g., a number of symbols), a number of repetitions (K), other parameters, or any combination thereof. In some examples, a DCI including a scheduling grant may also include an indication (e.g., an SLIV field) indicating such configuration information.

In some examples, one or more repetitions 220 may be scheduled or configured within slots 210 or across slot boundaries 215. Physical uplink channel repetition type B may also support dynamic indications of a number of repetitions, inter-nominal repetition frequency hopping, uplink/downlink symbol interaction, configuration indications and configuration information, or the like. In some examples of physical uplink channel repetitions, a base station 105 may configure a UE 115 to transmit one or more repetitions of an uplink message (e.g., a data message on a PUSCH or a control message on a PUCCH). Base station 105 may configure (e.g., via DCI 205-*b*) UE 115 to transmit one or more repetitions 220. For instance, base station 105 may transmit DCI 205-*b* during or prior to slot 210-*c* to trigger an uplink message. Configuration information (e.g., included in DCI 205-*b*) may indicate a starting symbol (e.g., S=10) for a first repetition 220 of the uplink message in a first slot 210, a length of each repetition (e.g., L=4), a number of repetitions (e.g., K=2), or the like. In such examples, UE 115 may transmit K=2 nominal repetitions, each having length L=4, back-to-back (e.g., consecutively) starting from symbol S=10. Thus, UE 115 may transmit first repetition 220-*c* of the uplink message during the last four symbols of slot 210-*c* (e.g., after the first ten symbols of slot 210-*c* based on S=10), and may then immediately transmit the second repetition 220-*d* of the uplink message during the first four symbols of next slot 210-*d* (e.g., the next four symbols following repetition 220-*c*). In some examples, UE 115 may transmit the uplink message on invalid symbols in slot 210-*d* according to the configuration information. The same or similar procedures may be performed for transmitting control messages on a PUCCH.

In some examples, one or more repetitions 220 may cross a slot boundary 215. In some cases, a portion of the divided repetition 220 may include a format that includes a constraint that a set of repetitions includes at least two symbols. In some cases, a divided repetition (e.g., divided repetition 220-*d*) may include a single symbol. Accordingly, a format may be adapted for the divided repetition with a single symbol. In some cases, a UE 115 may format different portions of a divided repetition 220 using different types of formatting as described in the present disclosure.

FIG. 3 illustrates an example of examples of physical uplink channel configurations 300, 301, and 302, respectively, that support mixed format techniques for orphaned symbols in uplink channel repetitions in accordance with aspects of the present disclosure. In some examples, physical uplink channel configuration 300, physical uplink channel configuration 301, and physical uplink channel configuration 302 may implement or may be implemented by aspects of wireless communications system 100. For instance, a UE 115 may communicate with a base station 105 according to physical uplink channel configurations 300, 301, and 302, and the UE 115 and the base station 105 may be examples of corresponding devices described with reference to FIG. 1. A base station may transmit configuration information to UE 115 (e.g., via a DCI 205, as described with reference to FIG. 2).

Figure 3A:
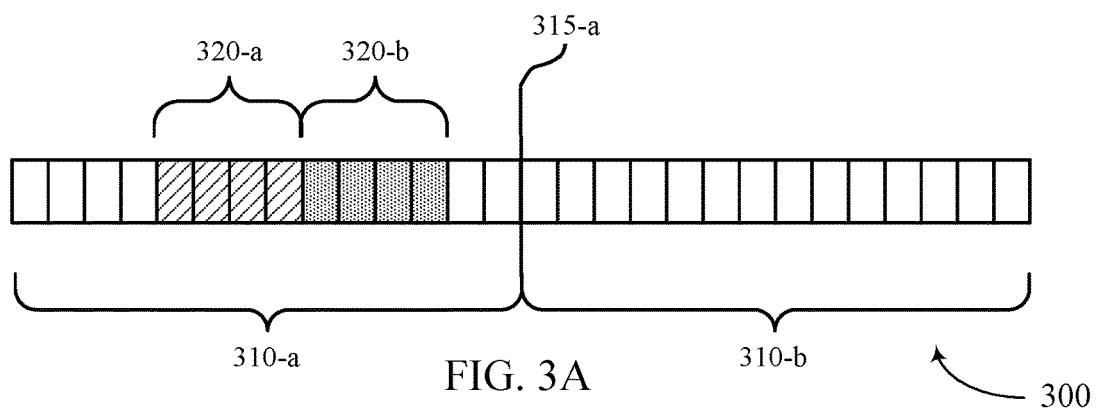
FIG. 3A through 3C illustrates an example of a physical uplink channel configuration that supports mixed format techniques for orphaned symbols in uplink channel repetitions in accordance with aspects of the present disclosure.

As illustrated with reference to FIG. 3A, UE 115 may identify, based on the configuration information, one or more repetitions 320 in slots 310. In some examples, repetitions 320 may be referred to as nominal repetitions. Nominal repetitions may be located in a virtual domain, and may ignore slot boundaries, downlink TTI interruptions, or the like. For instance, where base station 105 configures an uplink message (e.g., a control message on a PUCCH or a data message on a PUSCH) with two consecutive repetitions of four symbols each starting after four symbols of a first slot 310, UE 115 may identify two nominal repetitions (e.g., repetition 320-*a* and repetition 320-*b* during slot 310-*a*).

However, in some examples, cross-slot repetitions may be supported (e.g., in physical uplink channel repetition type B for PUSCH or PUCCH). For instance, as illustrated with reference to FIG. 3B, base station 105 may configure four consecutive nominal repetitions having a length of four symbols (e.g., repetition 320-*c*, repetition 320-*d*, repetition 320-*e*, and repetition 320-*f*) to start after four symbols of slot 310-*c*. However, repetition 320-*e* may cross slot boundary 315-*b* between slot 310-*c* and slot 310-*d*. UE 115 may perform uplink transmissions in slot 310-*c* according to a first set of transmission parameters (e.g., transmit power, beam selection, modulation and coding scheme (MCS), TCI state, or the like), and may perform uplink transmissions in slot 310-*d* according to a second set of transmission parameters. If a first portion 325 of a repetition 320 is located on one side of a TTI boundary, such as a slot boundary 315, and another portion 325 of the repetition 320 is on the other side of the TTI boundary, such as the slot boundary 315, then the different portions 325 of the repetition 320 may be transmitted using different transmission parameters.

Figure 3B:
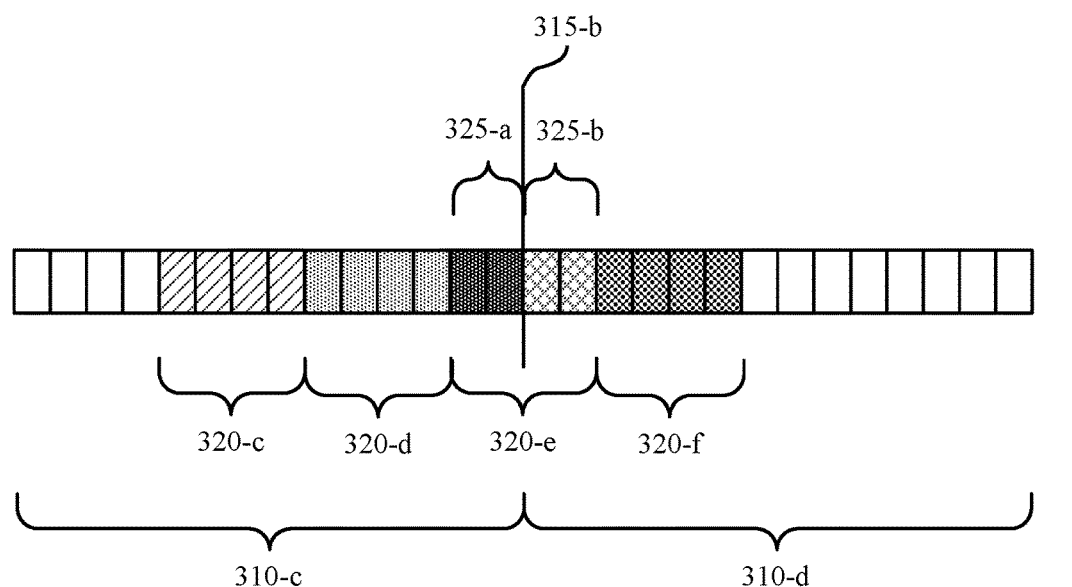

For FIG. 3B, although base station 105 configures four nominal repetitions, UE 115 may transmit five actual repetitions. An actual repetition may be defined as a portion 325 of a repetition 320. For instance, a nominal repetition may be broken into multiple actual repetitions due to slot boundaries, downlink TTI interruption, or the like. Thus, although base station 105 schedules four nominal repetitions (e.g., repetition 320-*c*, repetition 320-*d*, repetition 320-*e*, and repetition 320-*f*), UE 115 may transmit five actual repetitions (e.g., repetition 320-*c*, repetition 320-*d*, first portion 325-*a* of repetition 320-*e*, second portion 325-*b* of repetition 320-*e*, and repetition 320-*f*).

Similarly, as illustrated with reference to FIG. 3C, a single repetition 320 may cross a slot boundary 315-*c*. In some cases, base station 105 may configure a one or more nominal repetition where S+L>14. For instance, base station 105 may configure UE 115 to transmit one repetition 320-*g* having a length of fourteen symbols starting after the first four symbols of slot 310-*e* (e.g., S=4). In such examples, repetition 320-*g* may cross slot boundary 315-*c*. Thus, although base station 105 configures a single nominal repetition (e.g., repetition 320-*g*), UE 115 may transmit two actual transmissions (e.g., first portion 325-*c* of repetition 320-*g* and second portion 325-*d* of repetition 320-*g*). UE 115 may transmit first portion 325-*c* using a first set of transmission parameters for slot 310-*e*, and may transmit the second portion 325-*d* using a second set of transmission parameters for slot 310-*f*.

In some cases, repetition 320-*e* may use a format with a constraint that the repetition 320-*e* includes at least two symbols. As shown, the first portion 325-*a* of repetition 320-*e* includes two symbols and the second portion 325-*b* of repetition 320-*e* includes two symbols. Accordingly, the first portion 325-*a* of repetition 320-*e* and the second portion 325-*b* of repetition 320-*e* may be formatted with a format that includes a two-symbol per repetition constraint (e.g., both formatted with the same format).

Figure 3C:
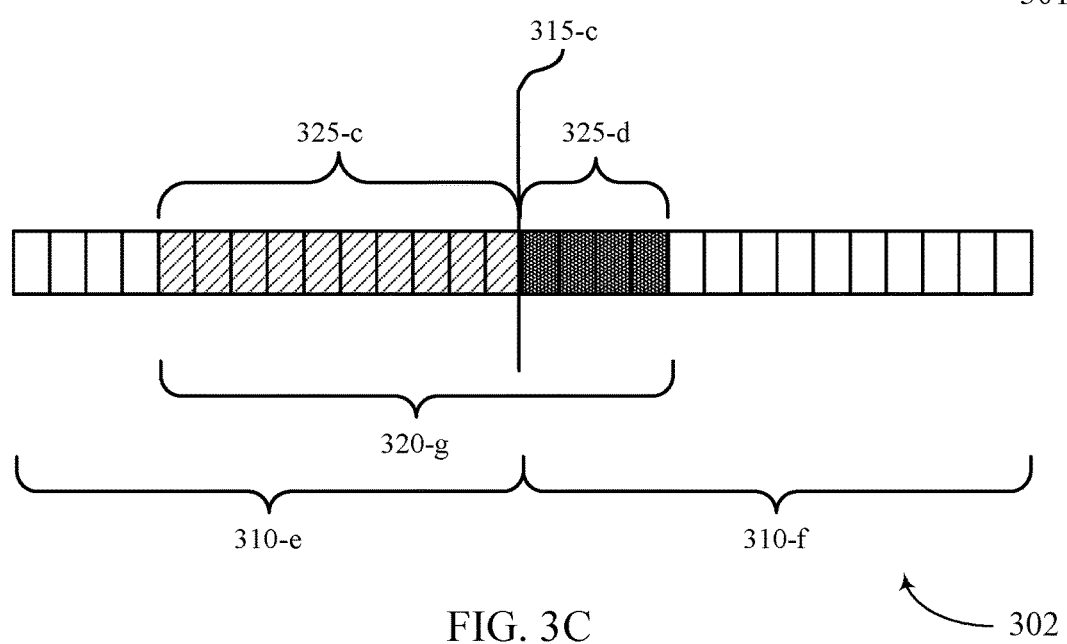

However, in some cases, a divided repetition (e.g., the first portion 325-*a* of repetition 320-*e* or the second portion 325-*b* of repetition 320-*e* for FIG. 3B, the first portion 325-*c* of repetition 320-*g* or the second portion 325-*d* of repetition 320-*g* for FIG. 3C) may include a single symbol. Accordingly, a format may be adapted for the divided repetition that includes a single symbol in a portion. In some cases, a UE 115 may format different portions of a divided repetition 220 using different types of formatting. For example, a UE 115 may format the first portion 325-*a* of repetition 320-*e* using a first format and may format the second portion 325-*b* of repetition 320-*e* using a second format different than the first format.

Figure 4:
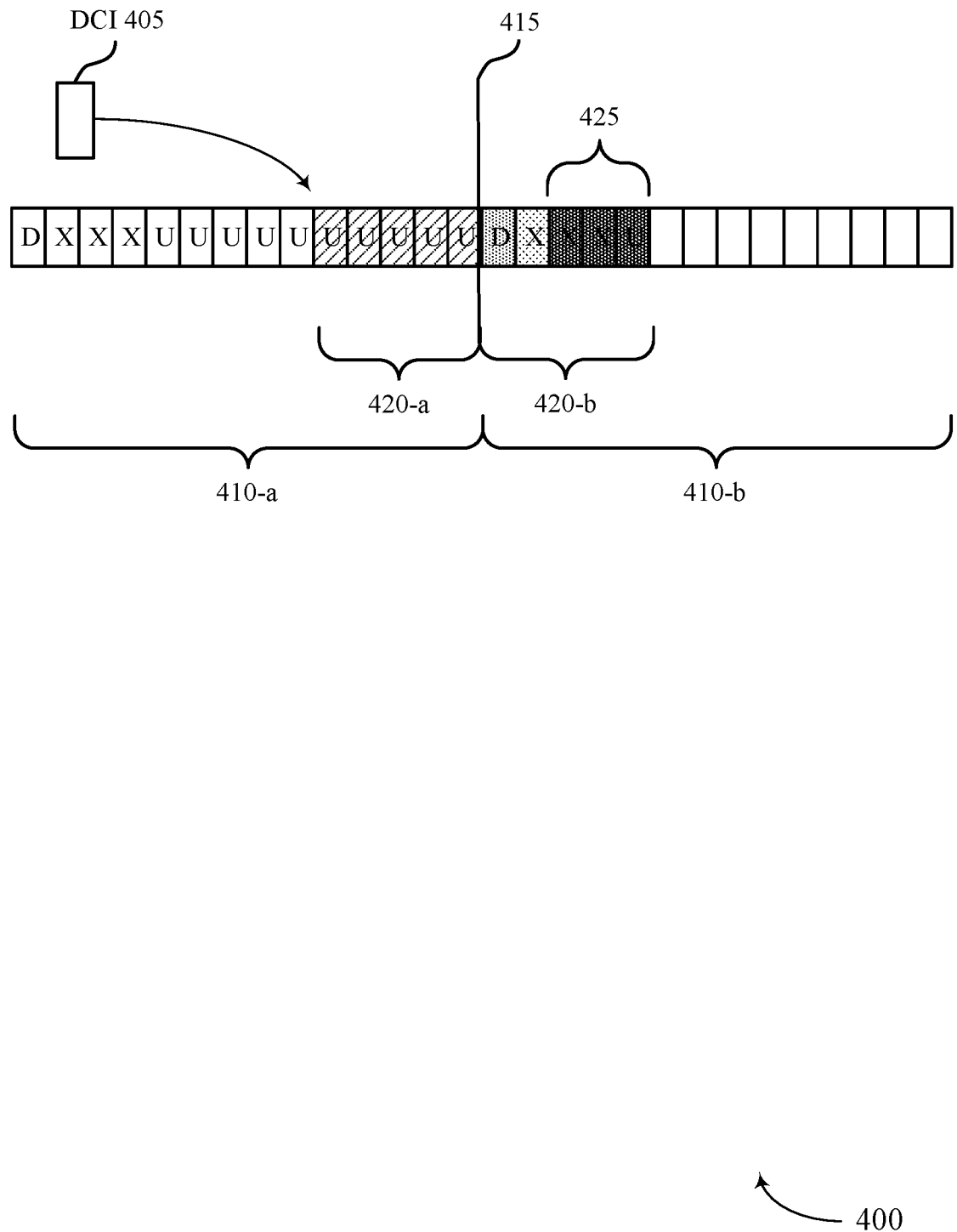
FIG. 4 illustrates an example of a physical uplink channel configuration that supports mixed format techniques for orphaned symbols in uplink channel repetitions in accordance with aspects of the present disclosure.

FIG. 4 illustrates an example of a physical uplink channel configuration 400 that supports mixed format techniques for orphaned symbols in uplink channel repetitions in accordance with aspects of the present disclosure. In some examples, physical uplink channel configuration 400 may be implemented by or may implement aspects of wireless communications system 100. For instance, a UE 115 may communicate with a base station 105 according to physical uplink channel configuration 400, and the UE 115 and the base station 105 may be examples of corresponding devices described with reference to FIG. 1.

In some examples (e.g., in wireless communications systems that support PUSCH repetitions type B or PUCCH repetitions type B), wireless communications systems may support segmentation of repetitions. In such examples, a nominal repetition may be segmented around slot boundary 415, semi-static downlink symbols, or other parameters (e.g., an invalidsymbolpattern indication). For instance, base station 105 may transmit a DCI 405, which may include configuration information for an uplink message (e.g., a data message on a PUSCH or a control message on a PUCCH). The configuration information may include a grant for two repetitions (e.g., K=2) having lengths of five symbols (e.g., L=5) starting after the first nine symbols of slot 410-*a* (e.g., S=9). In some examples, an indication (e.g., in DCI 405 or another downlink message) such as an invalidsymbolpattern indicator may indicate useable symbols for a physical uplink channel (e.g., a PUSCH). For instance, the indication may indicate that one or more invalid symbols (e.g., the third and fourth invalid symbols of slot 410-*b*) are useable for a repetition 420. In such examples, UE 115 may identify two nominal repetitions (e.g., repetition 420-*a* and repetition 420-*b*), and may transmit two actual repetitions (e.g., portion 425 of repetition 420-*b*). In some examples, portion 425 of repetition 420-*b* may include some symbols, but not all symbols of nominal repetition 420-*b*.

Thus, as described with reference to FIGS. 3B, 3C, and 5, in some examples, due to a nominal repetition that crosses a slot boundary, or an intervening downlink symbol, or configuration information, or any combination thereof, UE 115 may transmit an actual transmission (e.g., portion of a nominal transmission), and may not be located in a same slot as another portion of the repetitions or of another repetition.

In some examples, the uplink message may be a control message on a PUCCH. In such examples, PUCCH repetition configurations may support multiple PUCCH repetitions within a single slot 310, unequal lengths across repetitions, slot boundaries breaking nominal repetitions in actual repetitions (e.g., two actual repetitions for one nominal repetition divided into two portions), DL OFDM symbols breaking nominal repetitions into multiple actual repetitions, or the like. Such PUCCH repetition configurations may be referred to as PUCCH repetition type B. Thus, data messages on a PUSCH or control messages on a PUCCH may experience the same issues resulting from actual repetitions (e.g., after a slot boundary, an intervening downlink symbol, or both).

In some cases, repetition 420-*a* may be formatted according to a format that includes a constraint that the repetition 420-*a* includes at least two symbols. As shown, the repetition 420-*a* and repetition 420-*b* (e.g., portion 425 of repetition 420-*b*) each includes at least two symbols. Accordingly, the repetition 420-*a* and repetition 420-*b* (e.g., portion 425 of repetition 420-*b*) may be formatted with a format that includes a two-symbol per repetition constraint (e.g., both repetitions formatted with the same format). However, in some cases, a divided repetition (e.g., portion 425 of repetition 420-*b*) may include a single symbol. Accordingly, a format may be adapted for the divided repetition that includes a single symbol. When portion 425 of repetition 420-*b* includes a single symbol, a UE 115 may format repetition 420-*a* using a first format and may format portion 425 of repetition 420-*b* using a second format different than the first format.

Figure 5:
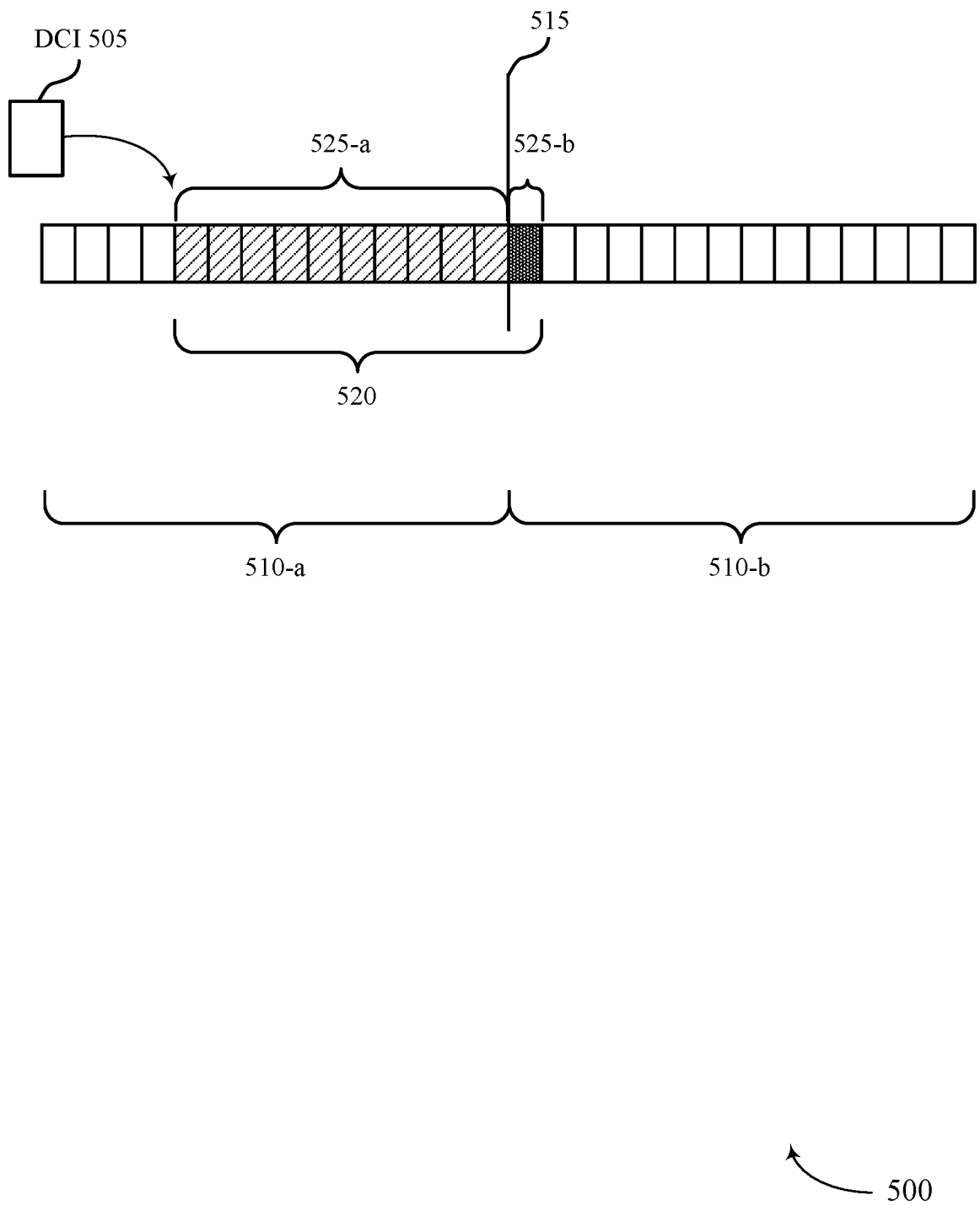
FIG. 5 illustrates an example of a physical uplink channel configuration that supports mixed format techniques for orphaned symbols in uplink channel repetitions in accordance with aspects of the present disclosure.

FIG. 5 illustrates an example of a physical uplink channel configuration 500 that supports mixed format techniques for orphaned symbols in uplink channel repetitions in accordance with aspects of the present disclosure. In some examples, physical uplink channel configuration 500 may be implemented by or may implement aspects of wireless communications system 100. For instance, a UE 115 may communicate with a base station 105 according to physical uplink channel configuration 500, and the UE 115 and the base station 105 may be examples of corresponding devices described with reference to FIG. 1.

In some examples, the base station 105 may provide the UE 115 with configuration information (e.g., indicate a configuration) that includes one or more parameters for transmitting a message on a physical uplink channel. In some cases, the one or more parameters may include an indication of a number of repetitions, an indication of a length of the repetition, an indication of a starting symbol for the repetition, or any combination thereof. In some examples, the UE 115 receiving the configuration may include the UE 115 receiving the configuration in a radio resource control message, or a media access control-control element message, or a downlink control information message, or any combination thereof. In some cases, the configuration may indicate to drop or skip an orphaned symbol. In some cases, the configuration may indicate one or more conditions (e.g., a channel condition, a signal power measurement, etc.) when the UE 115 may drop an orphaned symbol or skip transmitting an orphaned symbol.

In some cases, the configuration information (e.g., at least partially included in DCI 505) may indicate a starting symbol (e.g., S=4, after the fourth symbol) for repetition 520 of the uplink message in a first slot 510-*a*, a length of the repetition (e.g., L=11), a number of repetitions (e.g., K=1), or the like. In such examples, UE 115 may transmit K=1 nominal repetitions having length L=11 starting from symbol S=4. Thus, UE 115 may identify one nominal repetition (e.g., repetition 520). However, in some examples, a repetition 520 may be divided by a TTI boundary (e.g., slot boundary 515), a downlink symbol, an invalid symbol, or the like. For instance, repetition 520 may cross slot boundary 515 between slot 510-*a* and slot 510-*b*. Thus, the UE 115 may divide the nominal repetition (e.g., repetition 520) into two actual transmissions (e.g., portion 525-*a* of repetition 520 and portion 525-*b* of repetition 520). In some cases, the portion 525-*a* of the message may include two or more symbols. In some cases, the physical uplink channel may include a physical uplink control channel.

In some examples, the UE 115 may format portion 525-*a* of repetition 520 based on a first format indicated by the configuration, and format portion 525-*b* of repetition 520 based on a second format indicated by the configuration. In some cases, the configuration may indicate a first format to use on a first portion of a set of repetitions (e.g., portion 525-*a*) and a second format to use on a second portion when the second portion includes a single symbol (e.g., portion 525-*b*). In some cases, a second format (e.g., a second format different than the first format, a modified second format) may be used on the second portion (e.g., portion 525-*b*) when the second portion includes one symbol or two symbols.

In some examples, the second format (e.g., format 0) may support or be used for sequence-based transmissions (e.g., without a demodulation reference signal (DMRS) or transmissions without a DMRS-based structure). In some cases, the first format may support or be used for DMRS-based transmissions, and the second format may not support DMRS-based transmissions (e.g., format 0). In some cases, the first format may rely on the existence of a DMRS or knowledge of the associated channel (e.g., channel estimation) to enable a base station to decode a transmission formatted according to the first format, while the second format may not rely on the existence of a DMRS or knowledge of the channel (e.g., channel estimation) to enable the base station to decode a transmission formatted according to the second format. In the second format, DMRS overhead may be reduced (e.g., eliminated completely) since channel estimation may not be used for non-coherent detection used in transmissions with sequence-based structures. In some cases, when the second format is used independent resources in the code domain may be assigned for HARQ-ACK feedback.

In some examples, the second format (e.g., format 2) may support or be used for DMRS-based transmissions or transmissions with a DMRS-based structure. In some examples, the second format may be selected based on the second format supporting a demodulation reference signal and data being encoded or multiplexed within the same symbol. Accordingly, in some cases the second format may be selected based on the second format supporting DMRS-based transmissions for orphaned symbols (e.g., when the DMRS and data are encoded or multiplexed in the same orphaned symbol).

In some cases, the configuration may indicate the format to use for portion 525-*b* based on portion 525-*b* including a single symbol and based on the format used for portion 525-*a*. In some cases, the configuration may include a list of formats to use based on when portion 525-*b* includes a single symbol and based on the format used for portion 525-*a*.

In some examples, the UE 115 may transmit, to the base station 105, the portion 525-*a* formatted by UE 115 according to the first format and the portion 525-*b* formatted by UE 115 according to the second format. In some examples, the UE 115 may select the second format based on a number of bits supported by the first format (e.g., a constraint on the number of bits used in a repetition). In some cases, formatting the portion 525-*b* may be based on the UE 115 selecting the second format (e.g., selecting the second format based on the configuration).

In some examples, the UE 115 may select the second format based on a number of bits supported by the second format matching the number of bits supported by the first format, where formatting the portion 525-*b* is based on UE 115 selecting the second format. In some examples, the UE 115 selecting the second format may include the UE 115 selecting a modified physical uplink control channel format, where a number of bits supported by the modified physical uplink control channel format matches the number of bits supported by the first format.

In some cases, the number of bits supported by the first format and the second format is 2 bits or less (e.g., each repetition of a given format includes 2 bits or less). In some cases, the number of bits supported by the first format and the second format is greater than 2 bits (e.g., each repetition of a given format includes 2 or more bits). In some cases, the configuration may indicate a maximum number of bits that may be used in a repetition of a given format (e.g., the first format includes 2 or more bits and up to 20 bits, or up to 30 bits, or up to 100 bits, up to 8,064 bits).

In some examples, the UE 115 may select the second format based on a number of resource blocks supported by the first format. In some examples, the UE 115 may select the second format based on a number of resource blocks supported by the second format matching the number of resource blocks supported by the first format (e.g., a maximum of 1 resource block supported by the first format and the second format, from 1 to 16 resource blocks supported by the first format and the second format). In some examples, the UE 115 selecting the second format may include the UE 115 selecting a modified physical uplink control channel format, where a number of resource blocks supported by the modified physical uplink control channel format matches the number of resource blocks supported by the first format and a number of bits supported by the modified physical uplink control channel format matches the number of bits supported by the first format.

In some cases, a physical uplink control channel format may include one or more constraints as shown in Table 1. As shown, a physical uplink control channel format 0 may include a constraint of 2 or less bits and 1 resource block. In some examples, a physical uplink control channel format 1 may include a constraint of 2 or less bits and 1 resource block (e.g., 1 physical resource block). For instance, a repetition formatted according to format 1 may include 2 or less bits and 1 resource block in the repetition. As shown in Table 1, a physical uplink control channel format 2 may include a constraint of greater than 2 bits and 1-16 resource blocks. As shown in Table 1, a physical uplink control channel format 3 may include a constraint of greater than 2 bits and 1-6 resource blocks, or 8-10 resource blocks, or 12 resource blocks, or 15 resource blocks, or 16 resource blocks. As shown in Table 1, a physical uplink control channel format 4 may include a constraint of greater than 2 bits and 1 resource block.

TABLE 1

| FORMAT TYPE | SYMBOL LENGTH | NUMBER OF BITS | NUMBER OF RBs |
| --- | --- | --- | --- |
| Format 0 | 1-2 | <=2 | 1 |
| Format 1 | 4-14 | <=2 | 1 |
| Format 2 | 1-2 | >2 | 1-16 |
| Format 3 | 4-14 | >2 | 1-6, 8-10, 12, 15, 16 |
| Format 4 | 4-14 | >2 | 1 |
| Mod Format 0a | 1-2 | >2 | 1-6, 8-10, 12, 15, 16 |
| Mod Format 0b | 1-2 | >2 | 1 |
| Mod Format 2a | 1-2 | <=2 | 1 |

In some examples, when portion 525-*a* is formatted according to physical uplink control channel format 1 of Table 1, based on the configuration the UE 115 may select physical uplink control channel format 0 of Table 1 to format portion 525-*b*. Because format 1 and format 0 both include a constraint of 2 or less bits and 1 resource block, the UE 115 may select a non-modified version of format 0 (e.g., format 0 of Table 1) to format portion 525-*b*.

In some examples, when portion 525-*a* is formatted according to physical uplink control channel format 1 of Table 1, the UE 115 may select, based on the configuration, physical uplink control channel modified format 2a of Table 1 to format portion 525-*b*. Because format 1 is constrained to less than or equal to 2 bits and 1 resource block, but format 2 is constrained to greater than 2 bits and 1-16 resource blocks, the UE 115 may select a modified version of format 2 that is constrained to less than or equal to 2 bits and 1 resource block (e.g., format 2a of Table 1) to format portion 525-*b*.

In some examples, when portion 525-*a* is formatted according to physical uplink control channel format 3 of Table 1, the UE 115 may select, based on the configuration, physical uplink control channel modified format 0a of Table 1 to format portion 525-*b*. Because format 3 is constrained to greater than 2 bits and 1-6, 8-10, 12, 15, 16 resource blocks, but format 0 is constrained to less than or equal to 2 bits and 1 resource block, the UE 115 may select a modified version of format 0 that is constrained to greater than 2 bits and 1-6, 8-10, 12, 15, 16 resource blocks (e.g., format 0a of Table 1) to format portion 525-*b*.

In some examples, when portion 525-*a* is formatted according to physical uplink control channel format 3 of Table 1, based on the configuration the UE 115 may select physical uplink control channel format 2 of Table 1 to format portion 525-*b*. Because format 3 and format 2 both include a constraint of greater than 2 bits, but format 3 is constrained to 1-6, 8-10, 12, 15, 16 resource blocks while format 2 allows 1-16 resource blocks, the UE 115 or a base station 105 may constrain format 2 to 1-6, 8-10, 12, 15, 16 resource blocks to format portion 525-*b*. In some cases, the configuration may indicate to the UE to match the number of resource blocks in the second format to the number of resource blocks allowed in the first format.

In some examples, when portion 525-*a* is formatted according to physical uplink control channel format 4 of Table 1, based on the configuration the UE 115 may select physical uplink control channel modified format 0b of Table 1 to format portion 525-*b*. Because format 4 and format 0 both include a constraint of 1 resource block, but format 0 is constrained to less than or equal to 2 bits while format 4 is constrained to greater than 2 bits, the UE 115 may select a modified version of format 0 that is constrained to greater than 2 bits (e.g., format 0b of Table 1) to format portion 525-*b*.

In some examples, when portion 525-*a* is formatted according to physical uplink control channel format 4 of Table 1, based on the configuration the UE 115 may select physical uplink control channel format 2 of Table 1 to format portion 525-*b*. Because format 4 and format 2 both include a constraint of greater than 2 bits, but format 4 is constrained to 1 resource block while format 2 allows 1-16 resource blocks, the UE 115 or a base station 105 may constrain format 2 to 1 resource block to format portion 525-*b*. In some cases, the configuration may indicate to the UE to match the number of resource blocks in the second format to the number of resource blocks allowed in the first format.

Figure 6:
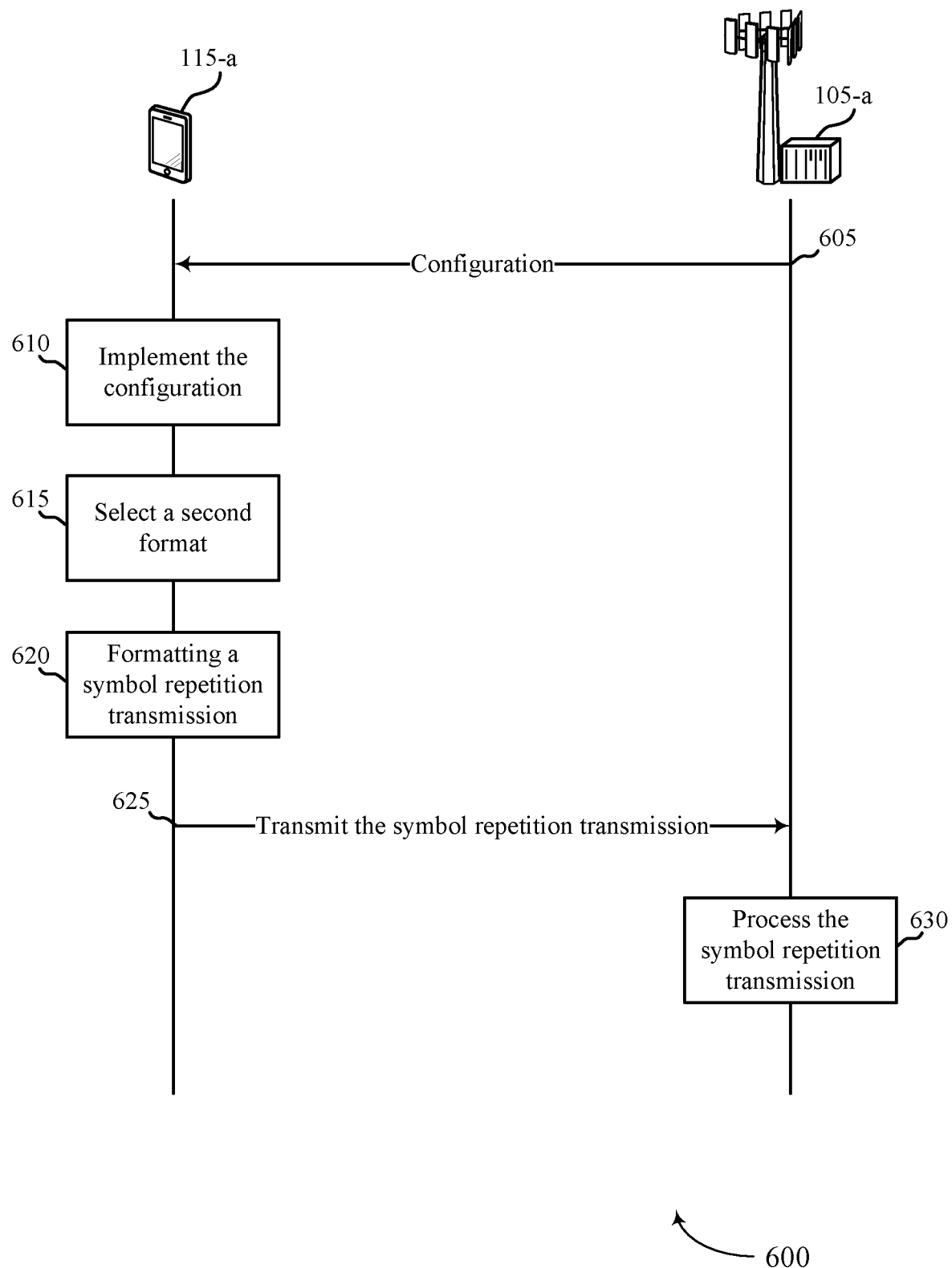
FIG. 6 illustrates an example of a process flow that supports mixed format techniques for orphaned symbols in uplink channel repetitions in accordance with aspects of the present disclosure.

FIG. 6 illustrates an example of a process flow 600 that supports mixed format techniques for orphaned symbols in uplink channel repetitions in accordance with aspects of the present disclosure. In some examples, process flow 600 may be implemented by or may implement aspects of wireless communications system 100. For instance, UE 615 and base station 605 may be examples of corresponding devices described with reference to FIG. 1, among others.

At 605, base station 105-*a* may transmit to UE 115-*a* an indication of a configuration for symbol repetition. In some cases, the configuration may include one or more parameters for transmitting a message on a physical uplink channel. In some cases, the configuration may indicate one or multiple formats to use for orphaned symbols in uplink channel repetitions. In some cases, the base station 105-*a* may generate the configuration and then transmit the generated configuration to the UE 115-*a*.

At 610, UE 115-*a* may receive the configuration from base station 105-*a* and implement the configuration. In some cases, the UE 115-*a* may use the configuration to configure one or more symbol repetition transmissions (e.g., to base station 105-*a*). In some cases, the UE 115-*a* may use the one or more parameters of the implemented configuration to transmit the message on the physical uplink channel.

At 615, UE 115-*a* may select a second format for a symbol repetition transmission (e.g., a set of repetitions of the message transmission). In some cases, UE 115-*a* may determine that the symbol repetition transmission is divided by a repetition partition (e.g., a slot boundary, a TTI boundary, a downlink symbol, an invalid symbol), or the like, based on the scheduling of the symbol repetition transmission. In some cases, UE 115-*a* may select a first format for a first portion of the symbol repetition transmission and select the second format for a second portion of the symbol repetition transmission. In some cases, UE 115-*a* may select the second format based on an aspect of a first format. In some cases, the aspect of the first format may include a number of bits supported by the first format or a number of resource blocks supported by the first format, or both. In some cases, UE 115-*a* may select the second format based on the second portion of the symbol repetition transmission having a single symbol. In some cases, UE 115-*a* may select the second format based on the second portion of the symbol repetition transmission being one or two symbols.

At 620, UE 115-*a* may format the first portion of the symbol repetition transmission according to the selected first format based on the first portion being scheduled for transmission before the repetition partition, and UE 115-*a* may format the second portion of the symbol repetition transmission according to the selected second format based on the second portion being scheduled for transmission after the repetition partition.

At 625, UE 115-*a* may transmit, to base station 105-*a*, the first portion of the symbol repetition transmission formatted according to the first format and transmit the second portion of the symbol repetition transmission formatted according to the second format.

At 630, base station 105-*a* may process the first portion of the symbol repetition transmission according to the first format and the second portion of the symbol repetition transmission of the message according to the second format.

Figure 7:
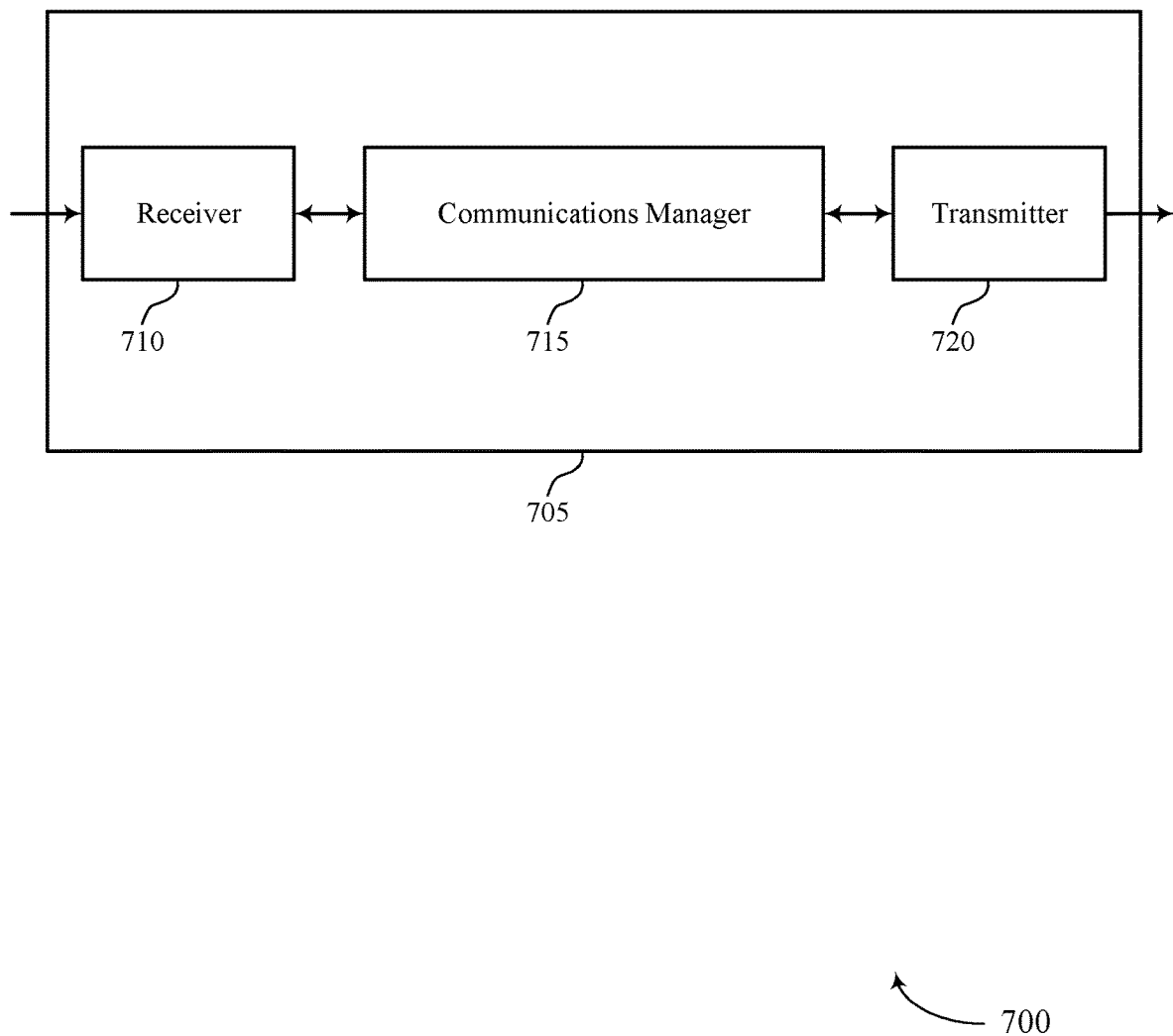
FIGS. 7 and 8 show block diagrams of devices that support mixed format techniques for orphaned symbols in uplink channel repetitions in accordance with aspects of the present disclosure.

FIG. 7 shows a block diagram 700 of a device 705 that supports mixed format techniques for orphaned symbols in uplink channel repetitions in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to mixed format techniques for orphaned symbols in uplink channel repetitions). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, an indication of a configuration for symbol repetition, the configuration including one or more parameters for transmitting a message on a physical uplink channel. The communications manager 715 may format, based on a first format indicated by the indication of the configuration, a first portion of a set of repetitions of the message scheduled for transmission before a slot boundary. The communications manager 715 may format based on a second format indicated by the indication of the configuration, a second portion of the set of repetitions of the message scheduled for transmission after the slot boundary, where the second portion of the set of repetitions is a single symbol. The communications manager 715 may transmit, to the base station, the first portion of the set of repetitions formatted according to the first format and the second portion of the set of repetitions according to the second format. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
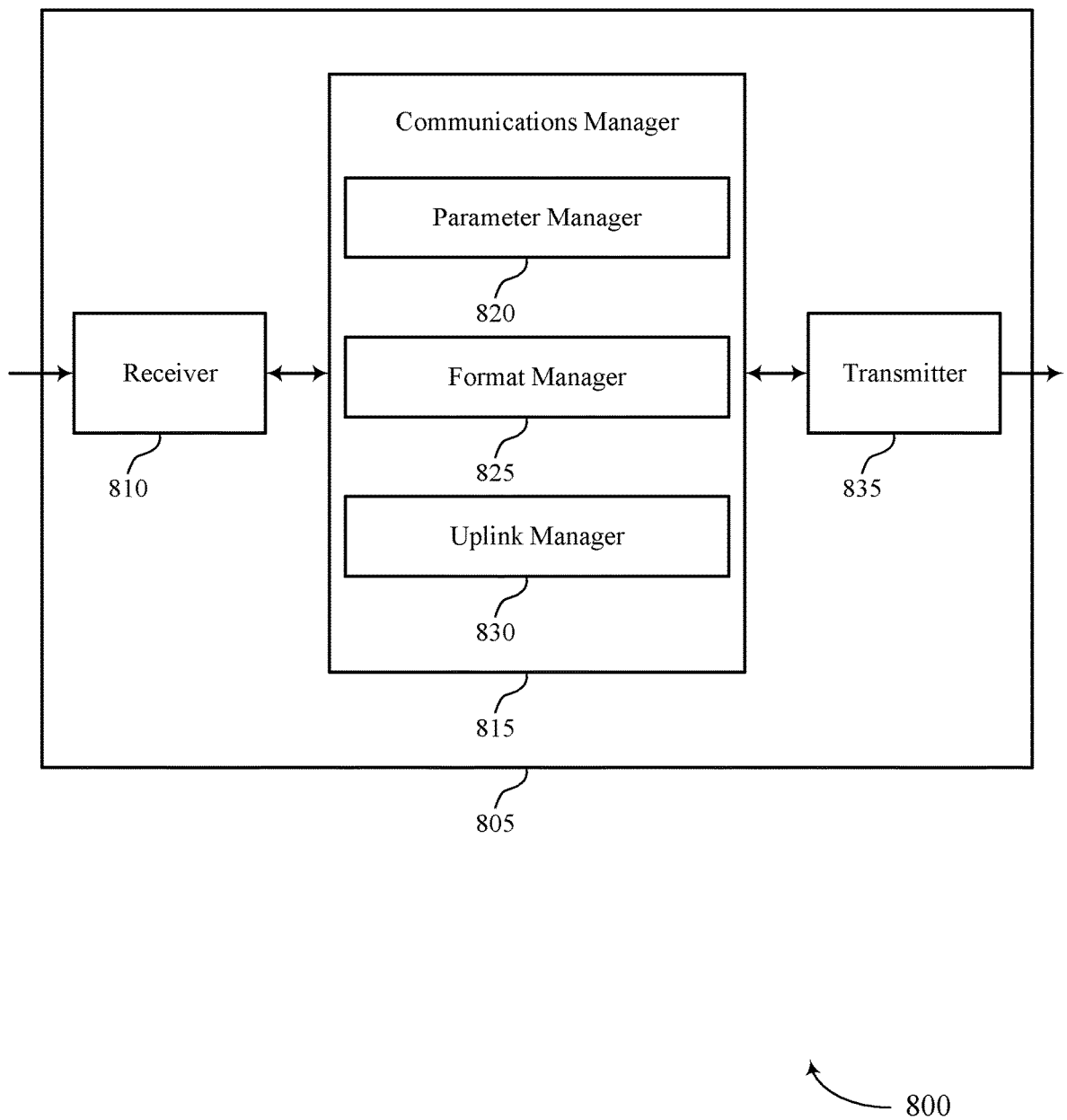

FIG. 8 shows a block diagram 800 of a device 805 that supports mixed format techniques for orphaned symbols in uplink channel repetitions in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to mixed format techniques for orphaned symbols in uplink channel repetitions). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a parameter manager 820, a format manager 825, and an uplink manager 830. The communications manager 815 may be an example of aspects of the communications manager 1010 described herein.

The parameter manager 820 may receive, from a base station, an indication of a configuration for symbol repetition, the configuration including one or more parameters for transmitting a message on a physical uplink channel. The format manager 825 may format, based on a first format indicated by the indication of the configuration, a first portion of a set of repetitions of the message scheduled for transmission before a slot boundary. The format manager 825 may format, based on a second format indicated by the indication of the configuration, a second portion of the set of repetitions of the message scheduled for transmission after the slot boundary, where the second portion of the set of repetitions is a single symbol. The uplink manager 830 may transmit, to the base station, the first portion of the set of repetitions formatted according to the first format and the second portion of the set of repetitions according to the second format. In some examples, the second format may support or be used for sequence-based transmissions (e.g., without a demodulation reference signal (DMRS) or transmissions without a DMRS-based structure). In some cases, the first format may support or be used for DMRS-based transmissions, and the second format may not support DMRS-based transmissions.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
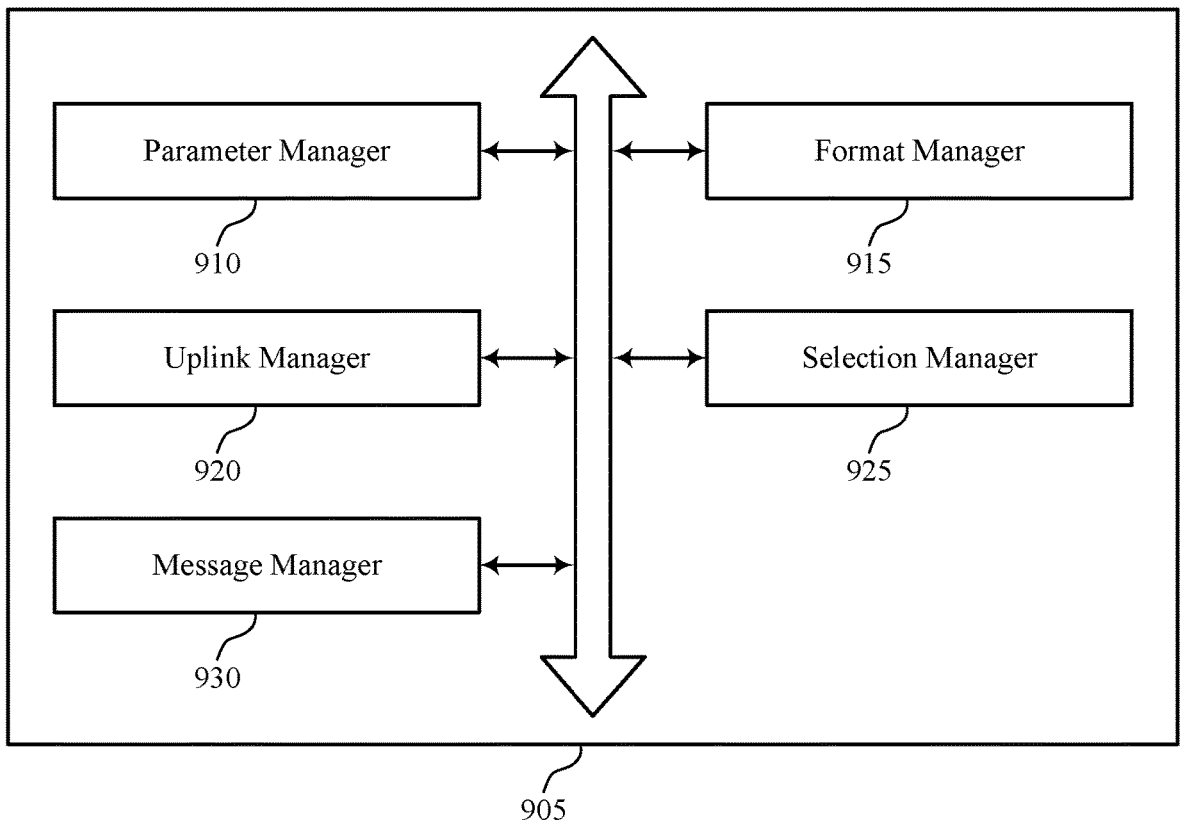
FIG. 9 shows a block diagram of a communications manager that supports mixed format techniques for orphaned symbols in uplink channel repetitions in accordance with aspects of the present disclosure.

FIG. 9 shows a block diagram 900 of a communications manager 905 that supports mixed format techniques for orphaned symbols in uplink channel repetitions in accordance with aspects of the present disclosure. The communications manager 905 may be an example of aspects of a communications manager 715, a communications manager 815, or a communications manager 1010 described herein. The communications manager 905 may include a parameter manager 910, a format manager 915, an uplink manager 920, a selection manager 925, and a message manager 930. Each of these modules may communicate, directly or indirectly, with one another (e.g., via one or more buses).

The parameter manager 910 may receive, from a base station, an indication of a configuration for symbol repetition, the configuration including one or more parameters for transmitting a message on a physical uplink channel. In some cases, the one or more parameters include an indication of a number of repetitions, an indication of a length of the repetition, an indication of a starting symbol for the repetition, or any combination thereof.

The format manager 915 may format, based on a first format indicated by the indication of the configuration, a first portion of a set of repetitions of the message scheduled for transmission before a slot boundary, and based on a second format indicated by the indication of the configuration, a second portion of the set of repetitions of the message scheduled for transmission after the slot boundary, where the second portion of the set of repetitions is a single symbol. In some cases, the first portion of the message includes two or more symbols.

In some cases, the physical uplink channel includes a physical uplink control channel. In some cases, the first format includes a physical uplink control channel format 1 and the second format includes a physical uplink control channel format 0. In some cases, the first format includes a physical uplink control channel format 1 and the second format includes a modified physical uplink control channel format 2. In some cases, the first format includes a physical uplink control channel format 3 and the second format includes a modified physical uplink control channel format 0. In some cases, the first format includes a physical uplink control channel format 3 and the second format includes a physical uplink control channel format 2. In some cases, the first format includes a physical uplink control channel format 4 and the second format includes a modified physical uplink control channel format 0. In some cases, the first format includes a physical uplink control channel format 4 and the second format includes a physical uplink control channel format 2.

The uplink manager 920 may transmit, to the base station, the first portion of the set of repetitions formatted according to the first format and the second portion of the set of repetitions according to the second format.

The selection manager 925 may select the second format based on a number of bits supported by the first format, where formatting the second portion of the set of repetitions is based on selecting the second format. In some examples, the selection manager 925 may select the second format based on the number of bits supported by the second format matching the number of bits supported by the first format, where formatting the second portion of the set of repetitions is based on selecting the second format. In some examples, the selection manager 925 may select the second format based on the second format supporting a demodulation reference signal and data being encoded or multiplexed within a single symbol.

In some examples, the selection manager 925 may select a modified physical uplink control channel format, where a number of bits supported by the modified physical uplink control channel format matches the number of bits supported by the first format. In some examples, the selection manager 925 may select the second format based on a number of resource blocks supported by the first format.

In some examples, the selection manager 925 may select the second format based on a number of resource blocks supported by the second format matching the number of resource blocks supported by the first format. In some examples, the selection manager 925 may select a modified physical uplink control channel format, where a number of resource blocks supported by the modified physical uplink control channel format matches the number of resource blocks supported by the first format, and where a number of bits supported by the modified physical uplink control channel format matches the number of bits supported by the first format.

In some cases, the number of bits supported by the first format and the second format is 2 bits or less. In some cases, the number of bits supported by the first format and the second format is greater than 2 bits.

The message manager 930 may receive the indication of the configuration in a radio resource control message, or a media access control-control element message, or a downlink control information message, or any combination thereof.

Figure 10:
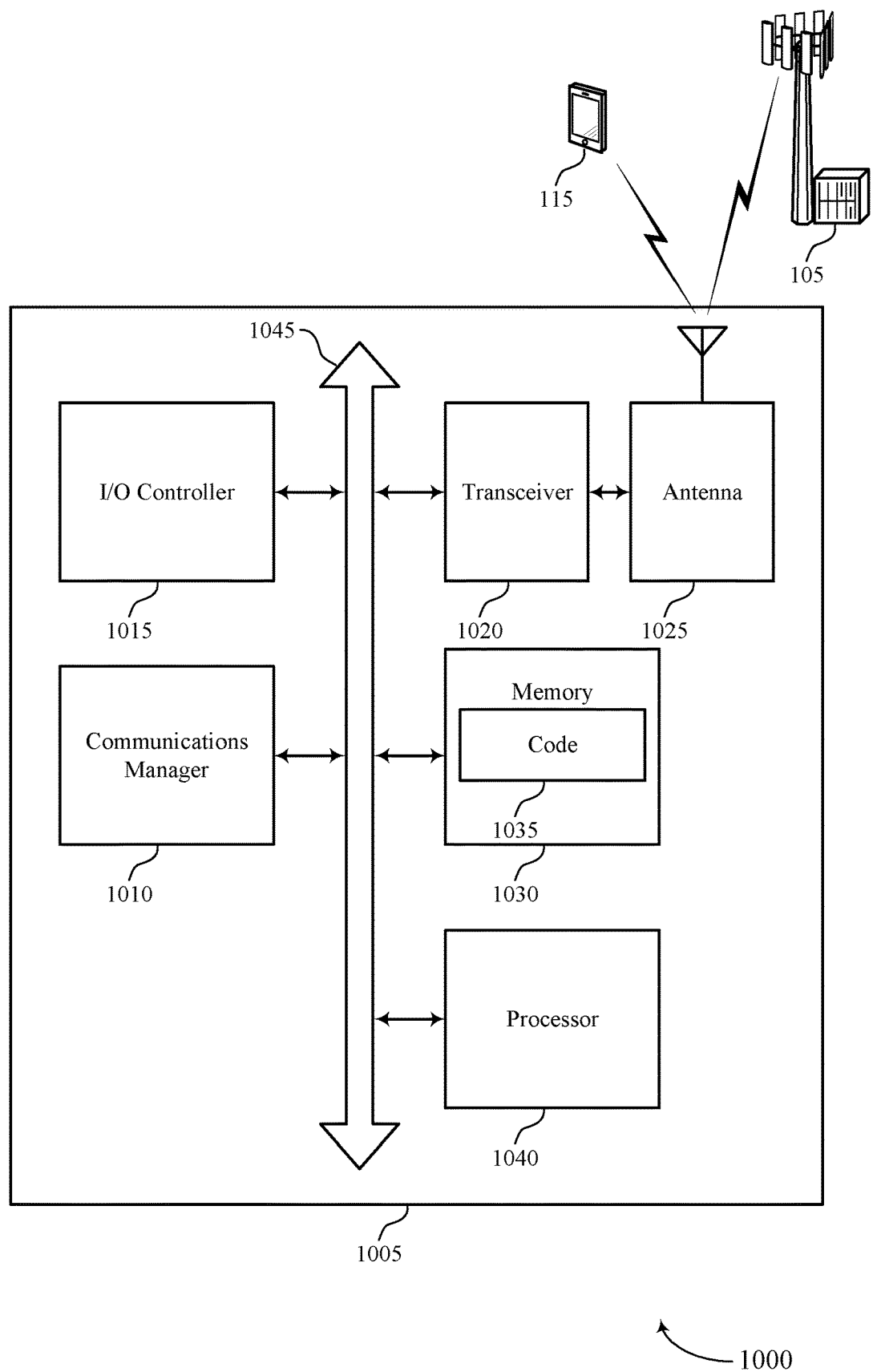
FIG. 10 shows a diagram of a system including a device that supports mixed format techniques for orphaned symbols in uplink channel repetitions in accordance with aspects of the present disclosure.

FIG. 10 shows a diagram of a system 1000 including a device 1005 that supports mixed format techniques for orphaned symbols in uplink channel repetitions in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, an indication of a configuration for symbol repetition, the configuration including one or more parameters for transmitting a message on a physical uplink channel, format, based on a first format indicated by the indication of the configuration, a first portion of a set of repetitions of the message scheduled for transmission before a slot boundary, and based on a second format indicated by the indication of the configuration, a second portion of the set of repetitions of the message scheduled for transmission after the slot boundary, where the second portion of the set of repetitions is a single symbol, and transmit, to the base station, the first portion of the set of repetitions formatted according to the first format and the second portion of the set of repetitions according to the second format.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting mixed format techniques for orphaned symbols in uplink channel repetitions).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
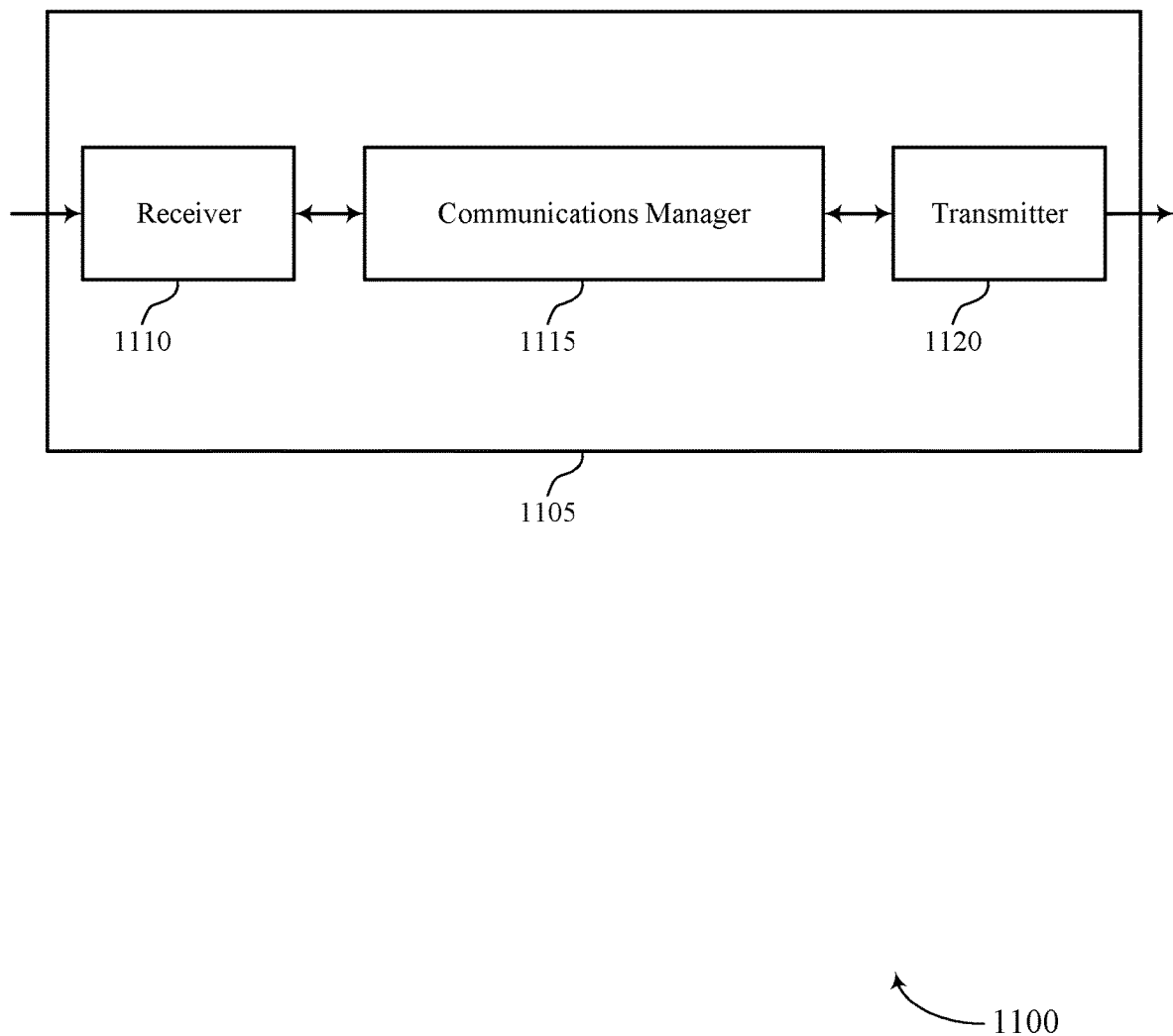
FIGS. 11 and 12 show block diagrams of devices that support mixed format techniques for orphaned symbols in uplink channel repetitions in accordance with aspects of the present disclosure.

FIG. 11 shows a block diagram 1100 of a device 1105 that supports mixed format techniques for orphaned symbols in uplink channel repetitions in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to mixed format techniques for orphaned symbols in uplink channel repetitions). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, an indication of a configuration for symbol repetition, the configuration including one or more parameters for transmitting a message on a physical uplink channel. The communications manager 1115 may receive, from the UE, a first portion of a set of repetitions of the message transmitted before a slot boundary and formatted according to a first format indicated by the indication of the configuration. The communications manager 1115 may receive, from the UE, a second portion of the set of repetitions of the message transmitted after the slot boundary and formatted according to a second format indicated by the indication of the configuration, the second portion of the set of repetitions being a single symbol. The communications manager 1115 may process the first portion of the set of repetitions of the message according to the first format and the second portion of the set of repetitions of the message according to the second format. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
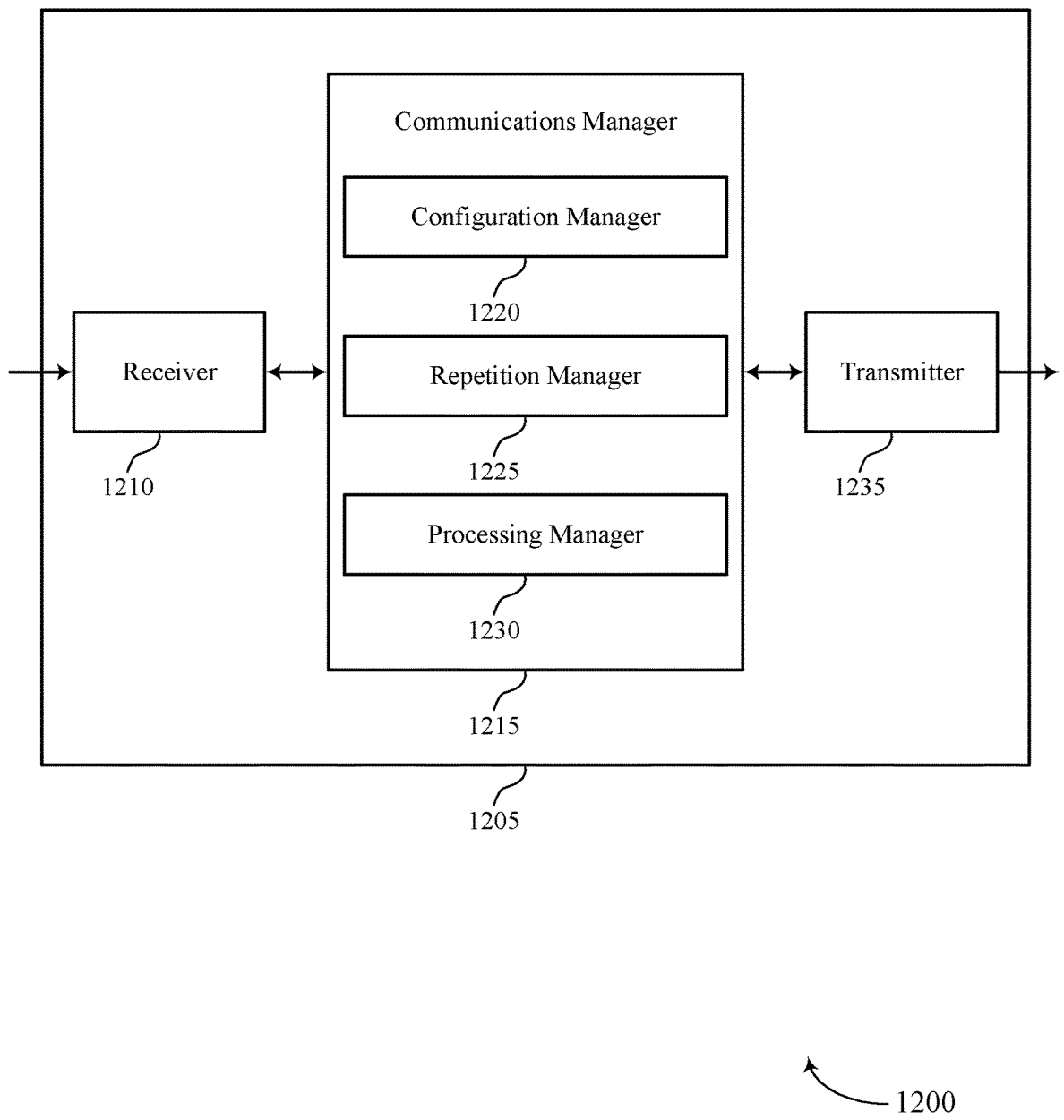

FIG. 12 shows a block diagram 1200 of a device 1205 that supports mixed format techniques for orphaned symbols in uplink channel repetitions in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to mixed format techniques for orphaned symbols in uplink channel repetitions). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration manager 1220, a repetition manager 1225, and a processing manager 1230. The communications manager 1215 may be an example of aspects of the communications manager 1410 described herein.

The configuration manager 1220 may transmit, to a UE, an indication of a configuration for symbol repetition, the configuration including one or more parameters for transmitting a message on a physical uplink channel.

The repetition manager 1225 may receive, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol.

The processing manager 1230 may process the first portion of the set of repetitions of the message according to the first format and the second portion of the set of repetitions of the message according to the second format. In some examples, the second format may support or be used for sequence-based transmissions (e.g., without a demodulation reference signal (DMRS) or transmissions without a DMRS-based structure). In some cases, the first format may support or be used for DMRS-based transmissions, and the second format may not support DMRS-based transmissions.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
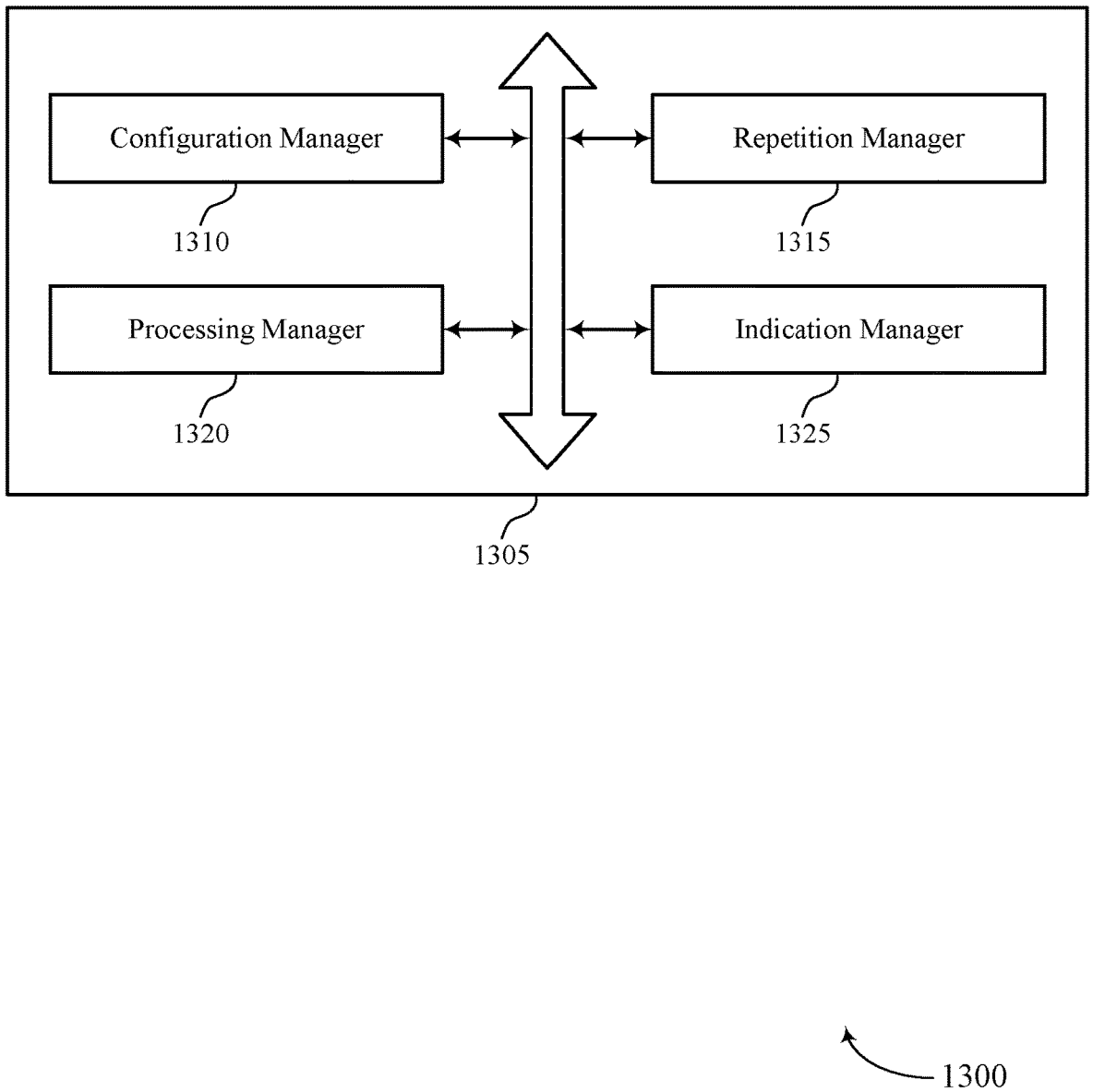
FIG. 13 shows a block diagram of a communications manager that supports mixed format techniques for orphaned symbols in uplink channel repetitions in accordance with aspects of the present disclosure.

FIG. 13 shows a block diagram 1300 of a communications manager 1305 that supports mixed format techniques for orphaned symbols in uplink channel repetitions in accordance with aspects of the present disclosure. The communications manager 1305 may be an example of aspects of a communications manager 1115, a communications manager 1215, or a communications manager 1410 described herein. The communications manager 1305 may include a configuration manager 1310, a repetition manager 1315, a processing manager 1320, and an indication manager 1325. Each of these modules may communicate, directly or indirectly, with one another (e.g., via one or more buses).

The configuration manager 1310 may transmit, to a UE, an indication of a configuration for symbol repetition, the configuration including one or more parameters for transmitting a message on a physical uplink channel. In some examples, the configuration manager 1310 may transmit the configuration in a radio resource control message, or a media access control-control element message, or a downlink control information message, or any combination thereof. In some cases, the first portion of the message includes two or more symbols. In some cases, the physical uplink channel includes a physical uplink control channel.

In some cases, the first format includes a physical uplink control channel format 1 and the second format includes a physical uplink control channel format 0. In some cases, the first format includes a physical uplink control channel format 1 and the second format includes a modified physical uplink control channel format 2.

In some cases, the first format includes a physical uplink control channel format 3 and the second format includes a modified physical uplink control channel format 0. In some cases, the first format includes a physical uplink control channel format 3 and the second format includes a physical uplink control channel format 2.

In some cases, the first format includes a physical uplink control channel format 4 and the second format includes a modified physical uplink control channel format 0. In some cases, the first format includes a physical uplink control channel format 4 and the second format includes a physical uplink control channel format 2.

In some cases, the one or more parameters include an indication of a number of repetitions, an indication of a length of the repetition, an indication of a starting symbol for the repetition, or any combination thereof.

The repetition manager 1315 may receive, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol.

The processing manager 1320 may process the first portion of the set of repetitions of the message according to the first format and the second portion of the set of repetitions of the message according to the second format. The indication manager 1325 may indicate, via the indication of the configuration, a selection of the second format for the UE to use based on a number of bits supported by the first format.

In some examples, the indication manager 1325 may indicate, via the indication of the configuration, a selection of the second format for the UE to use based on a number of bits supported by the second format matching the number of bits supported by the first format. In some examples, the indication manager 1325 may indicate, via the indication of the configuration, a modified physical uplink control channel format, where a number of bits supported by the modified physical uplink control channel format matches the number of bits supported by the first format. In some examples, the indication manager 1325 may indicate, via the indication of the configuration, a selection of the second format for the UE to use based on the second format supporting a demodulation reference signal and data being encoded or multiplexed within a single symbol.

In some examples, the indication manager 1325 may indicate, via the indication of the configuration, a selection of the second format for the UE to use based on a number of resource blocks supported by the first format. In some examples, the indication manager 1325 may indicate, via the indication of the configuration, a selection of the second format for the UE to use based on a number of resource blocks supported by the second format matching the number of resource blocks supported by the first format.

In some examples, the indication manager 1325 may indicate, via the indication of the configuration, a modified physical uplink control channel format, where a number of resource blocks supported by the modified physical uplink control channel format matches the number of resource blocks supported by the first format, and where a number of bits supported by the modified physical uplink control channel format matches the number of bits supported by the first format.

In some cases, the number of bits supported by the first format and the second format is 2 bits or less. In some cases, the number of bits supported by the first format and the second format is greater than 2 bits.

Figure 14:
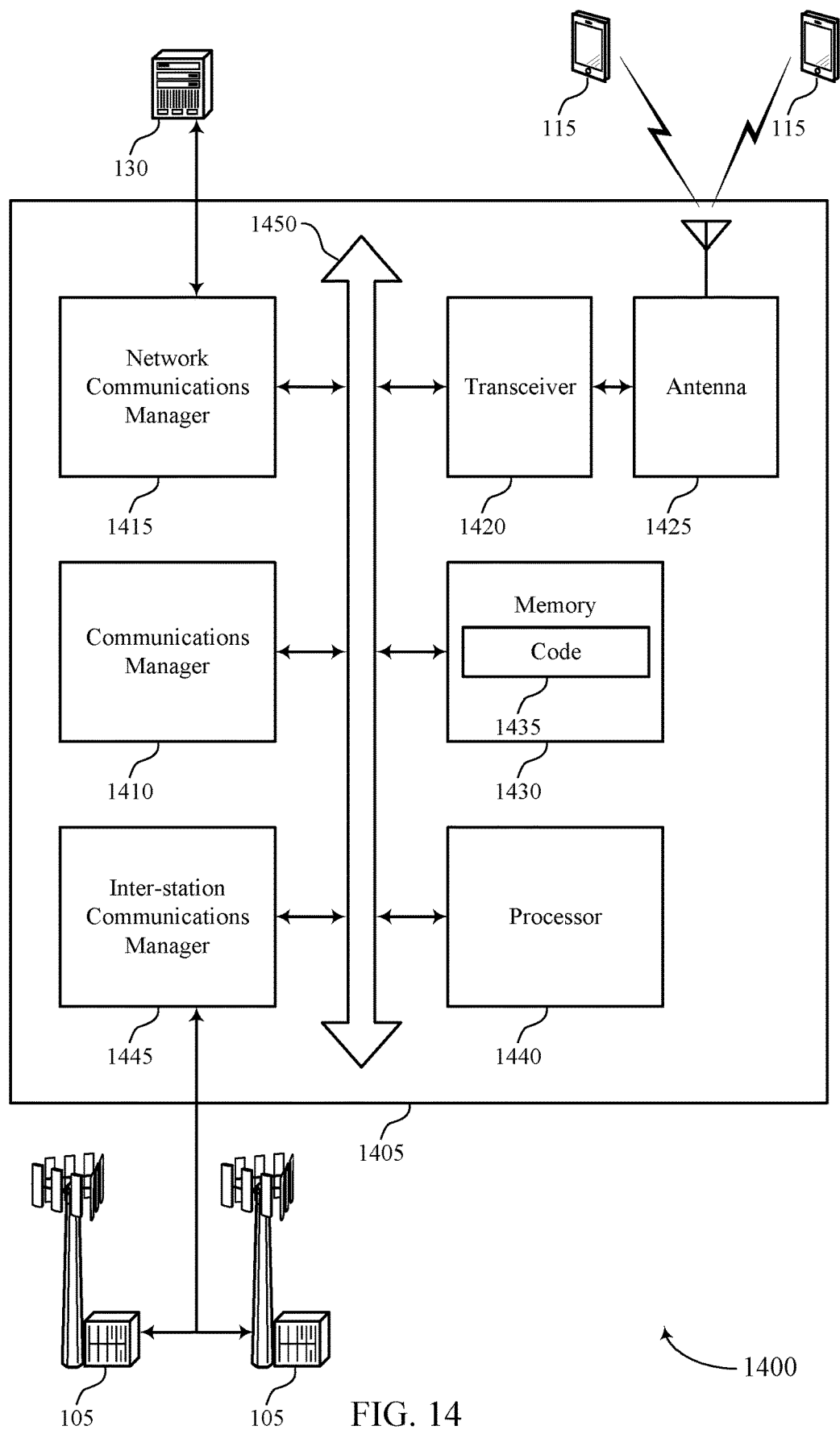
FIG. 14 shows a diagram of a system including a device that supports mixed format techniques for orphaned symbols in uplink channel repetitions in accordance with aspects of the present disclosure.

FIG. 14 shows a diagram of a system 1400 including a device 1405 that supports mixed format techniques for orphaned symbols in uplink channel repetitions in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, an indication of a configuration for symbol repetition, the configuration including one or more parameters for transmitting a message on a physical uplink channel. The communications manager 1410 may receive, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol. The communications manager 1410 may process the first portion of the set of repetitions of the message according to the first format and the second portion of the set of repetitions of the message according to the second format.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting mixed format techniques for orphaned symbols in uplink channel repetitions).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
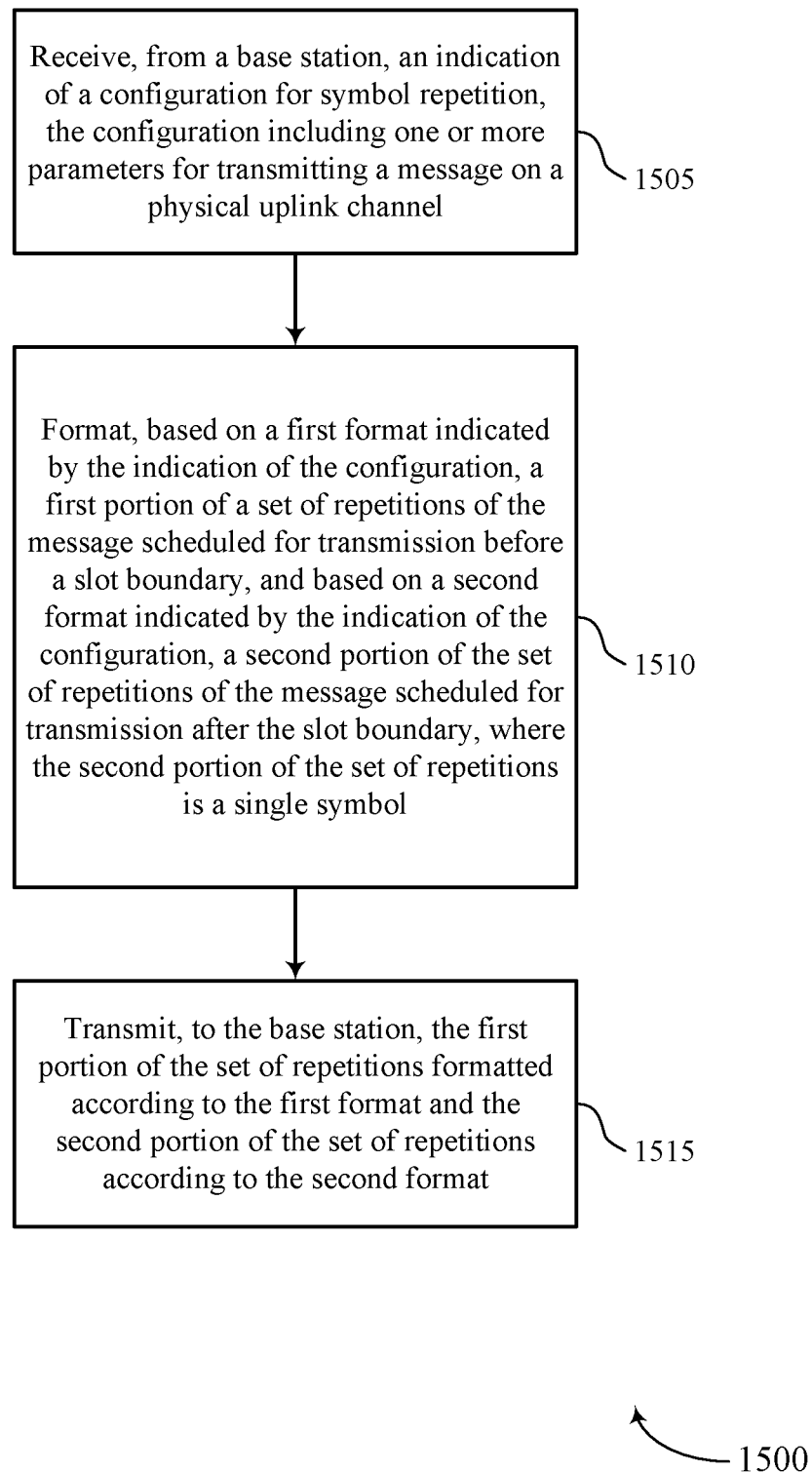
FIGS. 15 through 18 show flowcharts illustrating methods that support mixed format techniques for orphaned symbols in uplink channel repetitions in accordance with aspects of the present disclosure.

FIG. 15 shows a flowchart illustrating a method 1500 that supports mixed format techniques for orphaned symbols in uplink channel repetitions in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, an indication of a configuration for symbol repetition, the configuration including one or more parameters for transmitting a message on a physical uplink channel. The operations of 1505 may be performed according to the methods described herein. In some examples, aspects of the operations of 1505 may be performed by a parameter manager as described with reference to FIGS. 7 through 10.

At 1510, the UE may format, based on a first format indicated by the indication of the configuration, a first portion of a set of repetitions of the message scheduled for transmission before a slot boundary, and based on a second format indicated by the indication of the configuration, a second portion of the set of repetitions of the message scheduled for transmission after the slot boundary, where the second portion of the set of repetitions is a single symbol. The operations of 1510 may be performed according to the methods described herein. In some examples, aspects of the operations of 1510 may be performed by a format manager as described with reference to FIGS. 7 through 10.

At 1515, the UE may transmit, to the base station, the first portion of the set of repetitions formatted according to the first format and the second portion of the set of repetitions according to the second format. The operations of 1515 may be performed according to the methods described herein. In some examples, aspects of the operations of 1515 may be performed by an uplink manager as described with reference to FIGS. 7 through 10.

Figure 16:
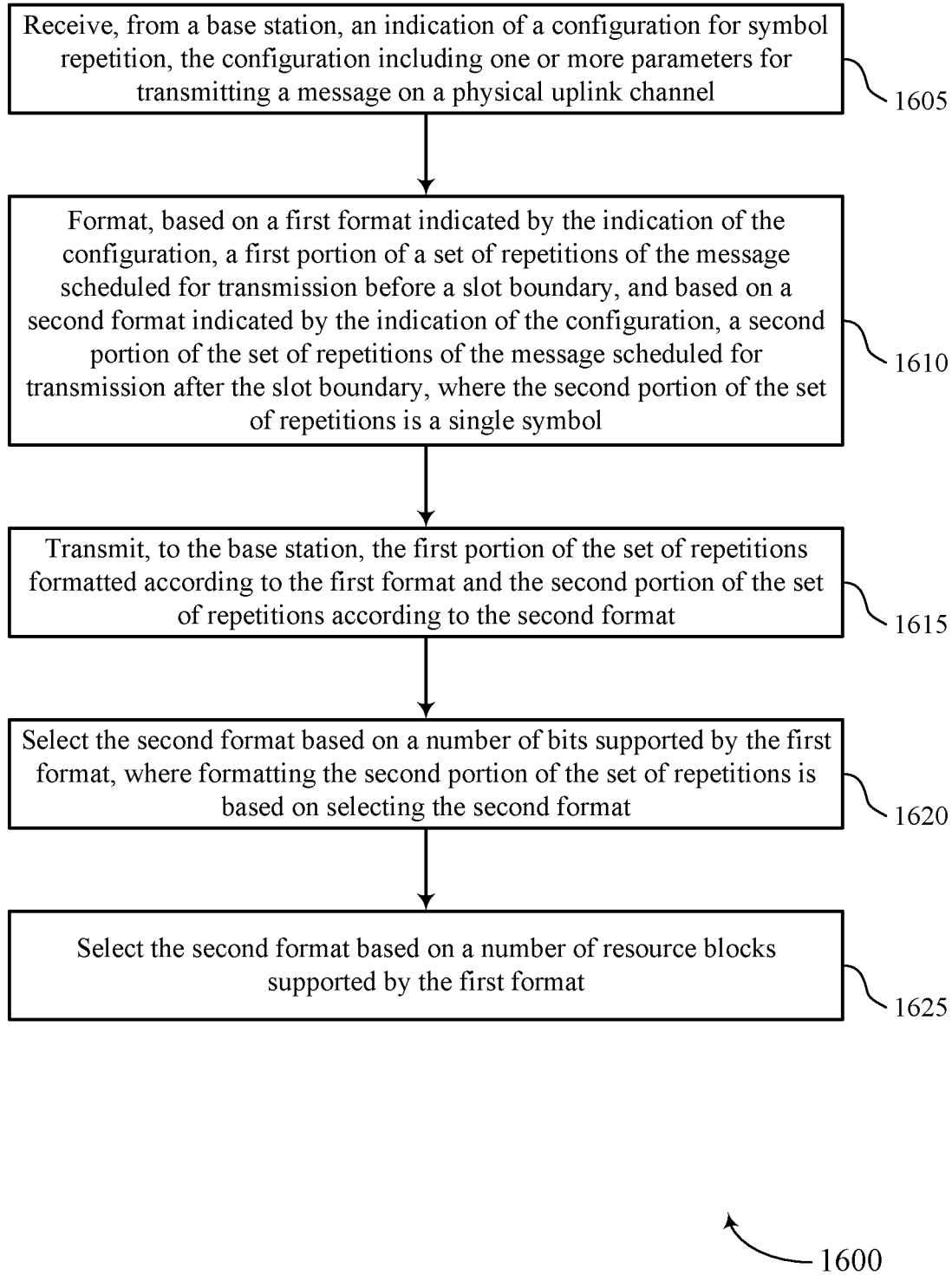

FIG. 16 shows a flowchart illustrating a method 1600 that supports mixed format techniques for orphaned symbols in uplink channel repetitions in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, an indication of a configuration for symbol repetition, the configuration including one or more parameters for transmitting a message on a physical uplink channel. The operations of 1605 may be performed according to the methods described herein. In some examples, aspects of the operations of 1605 may be performed by a parameter manager as described with reference to FIGS. 7 through 10.

At 1610, the UE may format, based on a first format indicated by the indication of the configuration, a first portion of a set of repetitions of the message scheduled for transmission before a slot boundary, and based on a second format indicated by the indication of the configuration, a second portion of the set of repetitions of the message scheduled for transmission after the slot boundary, where the second portion of the set of repetitions is a single symbol. The operations of 1610 may be performed according to the methods described herein. In some examples, aspects of the operations of 1610 may be performed by a format manager as described with reference to FIGS. 7 through 10.

At 1615, the UE may transmit, to the base station, the first portion of the set of repetitions formatted according to the first format and the second portion of the set of repetitions according to the second format. The operations of 1615 may be performed according to the methods described herein. In some examples, aspects of the operations of 1615 may be performed by an uplink manager as described with reference to FIGS. 7 through 10.

At 1620, the UE may select the second format based on a number of bits supported by the first format, where formatting the second portion of the set of repetitions is based on selecting the second format. The operations of 1620 may be performed according to the methods described herein. In some examples, aspects of the operations of 1620 may be performed by a selection manager as described with reference to FIGS. 7 through 10.

At 1625, the UE may select the second format based on a number of resource blocks supported by the first format. The operations of 1625 may be performed according to the methods described herein. In some examples, aspects of the operations of 1625 may be performed by a selection manager as described with reference to FIGS. 7 through 10.

Figure 17:
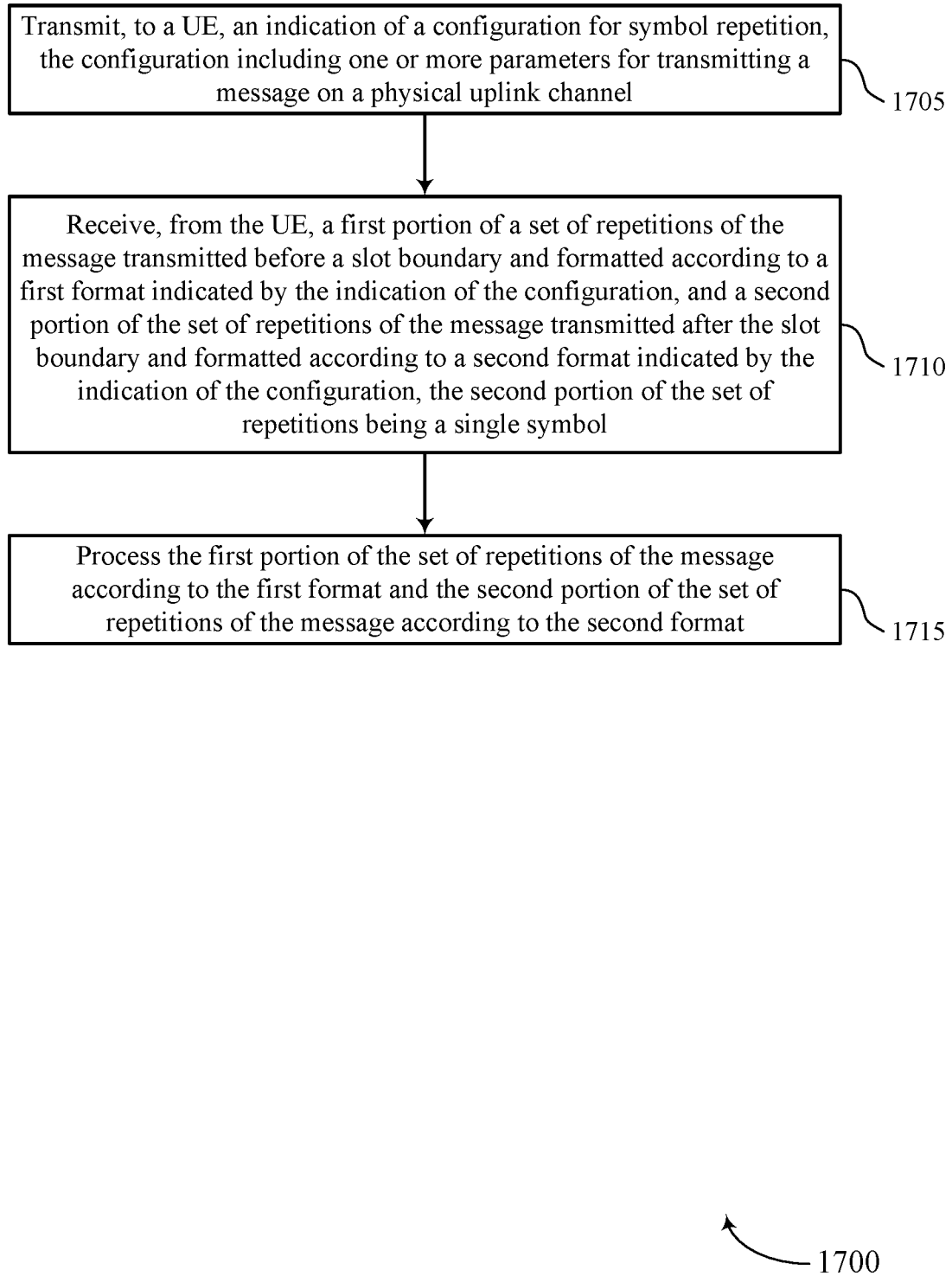

FIG. 17 shows a flowchart illustrating a method 1700 that supports mixed format techniques for orphaned symbols in uplink channel repetitions in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, an indication of a configuration for symbol repetition, the configuration including one or more parameters for transmitting a message on a physical uplink channel. The operations of 1705 may be performed according to the methods described herein. In some examples, aspects of the operations of 1705 may be performed by a configuration manager as described with reference to FIGS. 11 through 14.

At 1710, the base station may receive, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol. The operations of 1710 may be performed according to the methods described herein. In some examples, aspects of the operations of 1710 may be performed by a repetition manager as described with reference to FIGS. 11 through 14.

At 1715, the base station may process the first portion of the set of repetitions of the message according to the first format and the second portion of the set of repetitions of the message according to the second format. The operations of 1715 may be performed according to the methods described herein. In some examples, aspects of the operations of 1715 may be performed by a processing manager as described with reference to FIGS. 11 through 14.

Figure 18:
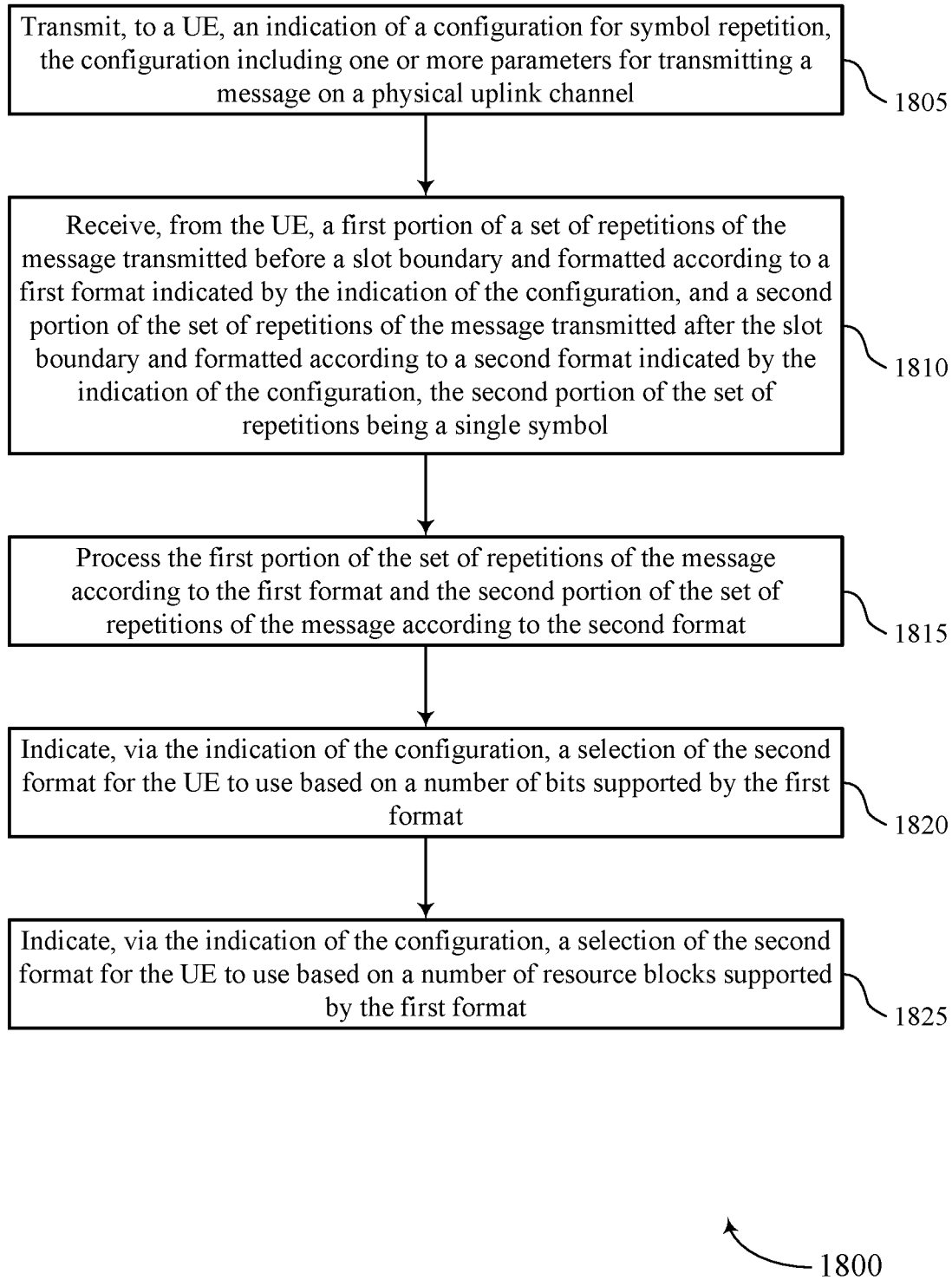

FIG. 18 shows a flowchart illustrating a method 1800 that supports mixed format techniques for orphaned symbols in uplink channel repetitions in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.18

At 1805, the base station may transmit, to a UE, an indication of a configuration for symbol repetition, the configuration including one or more parameters for transmitting a message on a physical uplink channel. The operations of 1805 may be performed according to the methods described herein. In some examples, aspects of the operations of 1805 may be performed by a configuration manager as described with reference to FIGS. 11 through 14.

At 1810, the base station may receive, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol. The operations of 1810 may be performed according to the methods described herein. In some examples, aspects of the operations of 1810 may be performed by a repetition manager as described with reference to FIGS. 11 through 14.

At 1815, the base station may process the first portion of the set of repetitions of the message according to the first format and the second portion of the set of repetitions of the message according to the second format. The operations of 1815 may be performed according to the methods described herein. In some examples, aspects of the operations of 1815 may be performed by a processing manager as described with reference to FIGS. 11 through 14.

At 1820, the base station may indicate, via the indication of the configuration, a selection of the second format for the UE to use based on a number of bits supported by the first format. The operations of 1820 may be performed according to the methods described herein. In some examples, aspects of the operations of 1820 may be performed by an indication manager as described with reference to FIGS. 11 through 14.

At 1825, the base station may indicate, via the indication of the configuration, a selection of the second format for the UE to use based on a number of resource blocks supported by the first format. The operations of 1825 may be performed according to the methods described herein. In some examples, aspects of the operations of 1825 may be performed by an indication manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication by a UE, comprising: receiving, from a base station, an indication of a configuration for symbol repetition, the configuration comprising one or more parameters for transmitting a message on a physical uplink channel; formatting, based at least in part on a first format indicated by the indication of the configuration, a first portion of a set of repetitions of the message scheduled for transmission before a slot boundary, and based at least in part on a second format indicated by the indication of the configuration, a second portion of the set of repetitions of the message scheduled for transmission after the slot boundary, wherein the second portion of the set of repetitions is a single symbol; and transmitting, to the base station, the first portion of the set of repetitions formatted according to the first format and the second portion of the set of repetitions according to the second format.

Aspect 2: The method of aspect 1, further comprising: selecting the second format based at least in part on a number of bits supported by the first format, wherein formatting the second portion of the set of repetitions is based at least in part on selecting the second format.

Aspect 3: The method of aspect 2, further comprising: selecting the second format based at least in part on the number of bits supported by the second format matching the number of bits supported by the first format, wherein formatting the second portion of the set of repetitions is based at least in part on selecting the second format.

Aspect 4: The method of any of aspects 2 through 3, wherein selecting the second format comprises: selecting a modified physical uplink control channel format, wherein a number of bits supported by the modified physical uplink control channel format matches the number of bits supported by the first format.

Aspect 5: The method of any of aspects 2 through 4, wherein the number of bits supported by the first format and the second format is 2 bits or less.

Aspect 6: The method of any of aspects 2 through 5, wherein the number of bits supported by the first format and the second format is greater than 2 bits.

Aspect 7: The method of any of aspects 1 through 6, further comprising: selecting the second format based at least in part on a number of resource blocks supported by the first format.

Aspect 8: The method of aspect 7, further comprising: selecting the second format based at least in part on a number of resource blocks supported by the second format matching the number of resource blocks supported by the first format.

Aspect 9: The method of any of aspects 7 through 8, wherein selecting the second format comprises: selecting a modified physical uplink control channel format, wherein a number of resource blocks supported by the modified physical uplink control channel format matches the number of resource blocks supported by the first format, and wherein a number of bits supported by the modified physical uplink control channel format matches the number of bits supported by the first format.

Aspect 10: The method of any of aspects 1 through 9, further comprising: selecting the second format based at least in part on the second format supporting a demodulation reference signal and data being encoded or multiplexed within a single symbol.

Aspect 11: The method of any of aspects 1 through 10, wherein receiving the indication of the configuration comprises: receiving the indication of the configuration in a radio resource control message, or a media access control-control element message, or a downlink control information message, or any combination thereof.

Aspect 12: The method of any of aspects 1 through 11, wherein the second format is configured for sequence-based transmissions.

Aspect 13: The method of any of aspects 1 through 12, wherein the first portion of the message comprises two or more symbols.

Aspect 14: The method of any of aspects 1 through 13, wherein the physical uplink channel comprises a physical uplink control channel.

Aspect 15: The method of any of aspects 1 through 14, wherein the first format comprises a physical uplink control channel format 1 and the second format comprises a physical uplink control channel format 0.

Aspect 16: The method of any of aspects 1 through 15, wherein the first format comprises a physical uplink control channel format 1 and the second format comprises a modified physical uplink control channel format 2.

Aspect 17: The method of any of aspects 1 through 16, wherein the first format comprises a physical uplink control channel format 3 and the second format comprises a modified physical uplink control channel format 0.

Aspect 18: The method of any of aspects 1 through 17, wherein the first format comprises a physical uplink control channel format 3 and the second format comprises a physical uplink control channel format 2.

Aspect 19: The method of any of aspects 1 through 18, wherein the first format comprises a physical uplink control channel format 4 and the second format comprises a modified physical uplink control channel format 0.

Aspect 20: The method of any of aspects 1 through 19, wherein the first format comprises a physical uplink control channel format 4 and the second format comprises a physical uplink control channel format 2.

Aspect 21: The method of any of aspects 1 through 20, wherein the one or more parameters comprise an indication of a number of repetitions, an indication of a length of the repetition, an indication of a starting symbol for the repetition, or any combination thereof.

Aspect 22: A method for wireless communication by a base station, comprising: transmitting, to a UE, an indication of a configuration for symbol repetition, the configuration comprising one or more parameters for transmitting a message on a physical uplink channel; receiving, from the UE, a first portion of a set of repetitions of the message transmitted before a slot boundary and formatted according to a first format indicated by the indication of the configuration, and a second portion of the set of repetitions of the message transmitted after the slot boundary and formatted according to a second format indicated by the indication of the configuration, the second portion of the set of repetitions being a single symbol; and processing the first portion of the set of repetitions of the message according to the first format and the second portion of the set of repetitions of the message according to the second format.

Aspect 23: The method of aspect 22, further comprising: indicating, via the indication of the configuration, a selection of the second format for the UE to use based at least in part on a number of bits supported by the first format.

Aspect 24: The method of aspect 23, further comprising: indicating, via the indication of the configuration, a selection of the second format for the UE to use based at least in part on a number of bits supported by the second format matching the number of bits supported by the first format.

Aspect 25: The method of any of aspects 23 through 24, further comprising: indicating, via the indication of the configuration, a modified physical uplink control channel format, wherein a number of bits supported by the modified physical uplink control channel format matches the number of bits supported by the first format.

Aspect 26: The method of any of aspects 23 through 25, wherein the number of bits supported by the first format and the second format is 2 bits or less.

Aspect 27: The method of any of aspects 23 through 26, wherein the number of bits supported by the first format and the second format is greater than 2 bits.

Aspect 28: The method of any of aspects 22 through 27, further comprising: indicating, via the indication of the configuration, a selection of the second format for the UE to use based at least in part on a number of resource blocks supported by the first format.

Aspect 29: An apparatus for wireless communication by a UE, comprising a processor; memory coupled with the processor; and instructions stored in the memory and executable by the processor to cause the apparatus to perform a method of any of aspects 1 through 21.

Aspect 30: An apparatus for wireless communication by a UE, comprising at least one means for performing a method of any of aspects 1 through 21.

Aspect 31: A non-transitory computer-readable medium storing code for wireless communication by a UE, the code comprising instructions executable by a processor to perform a method of any of aspects 1 through 21.

Aspect 32: An apparatus for wireless communication by a base station, comprising a processor; memory coupled with the processor; and instructions stored in the memory and executable by the processor to cause the apparatus to perform a method of any of aspects 22 through 28.

Aspect 33: An apparatus for wireless communication by a base station, comprising at least one means for performing a method of any of aspects 22 through 28.

Aspect 34: A non-transitory computer-readable medium storing code for wireless communication by a base station, the code comprising instructions executable by a processor to perform a method of any of aspects 22 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving, from a base station, an indication of a configuration for symbol repetition, the configuration comprising one or more parameters for transmitting a message on a physical uplink channel;
   selecting a second format based at least in part on a number of bits supported by a first format indicated by the indication of the configuration;
   formatting, based at least in part on the first format indicated by the indication of the configuration, a first portion of a set of repetitions of the message scheduled for transmission before a slot boundary, and based at least in part on the second format indicated by the indication of the configuration, a second portion of the set of repetitions of the message scheduled for transmission after the slot boundary, wherein the second portion of the set of repetitions is a single symbol, and wherein formatting the second portion of the set of repetitions is based at least in part on selecting the second format; and
   transmitting, to the base station, the first portion of the set of repetitions formatted according to the first format and the second portion of the set of repetitions according to the second format.

2. The method of claim 1, further comprising:
   selecting the second format based at least in part on a number of bits supported by the second format matching the number of bits supported by the first format, wherein formatting the second portion of the set of repetitions is based at least in part on selecting the second format.

3. The method of claim 1, wherein selecting the second format comprises:
   selecting a modified physical uplink control channel format, wherein a number of bits supported by the modified physical uplink control channel format matches the number of bits supported by the first format.

4. The method of claim 1, wherein the number of bits supported by the first format is 2 bits or less and a number of bits supported by the second format is 2 bits or less.

5. The method of claim 1, wherein the number of bits supported by the first format is greater than 2 bits and a number of bits supported by the second format is greater than 2 bits.

6. The method of claim 1, further comprising:
   selecting the second format based at least in part on the second format supporting a demodulation reference signal and data being encoded or multiplexed within a single symbol.

7. The method of claim 1, wherein receiving the indication of the configuration comprises:

receiving the indication of the configuration in a radio resource control message, or a media access control-control element message, or a downlink control information message, or any combination thereof.

8. The method of claim 1, wherein the second format is configured for sequence-based transmissions.

9. The method of claim 1, wherein the first portion of the message comprises two or more symbols.

10. The method of claim 1, wherein the physical uplink channel comprises a physical uplink control channel.

11. The method of claim 1, wherein the first format comprises a physical uplink control channel format 1 and the second format comprises a physical uplink control channel format 0.

12. The method of claim 1, wherein the first format comprises a physical uplink control channel format 1 and the second format comprises a modified physical uplink control channel format 2.

13. The method of claim 1, wherein the first format comprises a physical uplink control channel format 3 and the second format comprises a modified physical uplink control channel format 0.

14. The method of claim 1, wherein the first format comprises a physical uplink control channel format 3 and the second format comprises a physical uplink control channel format 2.

15. The method of claim 1, wherein the first format comprises a physical uplink control channel format 4 and the second format comprises a modified physical uplink control channel format 0.

16. The method of claim 1, wherein the first format comprises a physical uplink control channel format 4 and the second format comprises a physical uplink control channel format 2.

17. The method of claim 1, wherein the one or more parameters comprise an indication of a number of repetitions, an indication of a length of a repetition, an indication of a starting symbol for a repetition, or any combination thereof.

18. A method for wireless communication by a user equipment (UE), comprising:
receiving, from a base station, an indication of a configuration for symbol repetition, the configuration comprising one or more parameters for transmitting a message on a physical uplink channel;
selecting a second format based at least in part on a number of resource blocks supported by a first format indicated by the indication of the configuration;
formatting, based at least in part on the first format indicated by the indication of the configuration, a first portion of a set of repetitions of the message scheduled for transmission before a slot boundary, and based at least in part on a and indicated by the indication of the configuration, a second portion of the set of repetitions of the message scheduled for transmission after the slot boundary, wherein the second portion of the set of repetitions is a single symbol, wherein formatting the second portion of the set of repetitions is based at least in part on selecting the second format; and
transmitting, to the base station, the first portion of the set of repetitions formatted according to the first format and the second portion of the set of repetitions according to the second format.

19. The method of claim 18, further comprising:
selecting the second format based at least in part on a number of resource blocks supported by the second format matching the number of resource blocks supported by the first format.

20. The method of claim 18, wherein selecting the second format comprises:
selecting a modified physical uplink control channel format, wherein a number of resource blocks supported by the modified physical uplink control channel format matches the number of resource blocks supported by the first format, and wherein a number of bits supported by the modified physical uplink control channel format matches a number of bits supported by the first format.

21. A method for wireless communication by a base station, comprising:
transmitting, to a user equipment (UE), an indication of a configuration for symbol repetition, the configuration comprising one or more parameters for transmitting a message on a physical uplink channel;
indicating, via the indication of the configuration, a selection of a second format for the UE to use based at least in part on a number of bits supported by a first format indicated by the indication of the configuration;
receiving, from the UE, a first portion of a set of repetitions of the message transmitted before a slot boundary and formatted according to the first format indicated by the indication of the configuration, and a second portion of the set of repetitions of the message transmitted after the slot boundary and formatted according to a second format indicated by the indication of the configuration, the second portion of the set of repetitions being a single symbol, and wherein the second portion of the set of repetitions is formatted based at least in part on selecting the second format; and
processing the first portion of the set of repetitions of the message according to the first format and the second portion of the set of repetitions of the message according to the second format.

22. The method of claim 21, further comprising:
indicating, via the indication of the configuration, a selection of the second format for the UE to use based at least in part on a number of bits supported by the second format matching the number of bits supported by the first format.

23. The method of claim 21, further comprising:
indicating, via the indication of the configuration, a modified physical uplink control channel format, wherein a number of bits supported by the modified physical uplink control channel format matches the number of bits supported by the first format.

24. The method of claim 21, wherein the number of bits supported by the first format and the second format is 2 bits or less.

25. The method of claim 21, wherein the number of bits supported by the first format and the second format is greater than 2 bits.

26. A method for wireless communication by a base station, comprising:
transmitting, to a user equipment (UE), an indication of a configuration for symbol repetition, the configuration comprising one or more parameters for transmitting a message on a physical uplink channel;
indicating, via the indication of the configuration, a selection of a second format for the UE to use based at least in part on a number of resource blocks supported by a first format indicated by the indication of the configuration;

receiving, from the UE, a first portion of a set of repetitions of the message transmitted before a slot boundary and formatted according to the first format indicated by the indication of the configuration, and a second portion of the set of repetitions of the message transmitted after the slot boundary and formatted according to a second format indicated by the indication of the configuration, the second portion of the set of repetitions being a single symbol, and wherein the second portion of the set of repetitions is formatted based at least in part on selecting the second format; and processing the first portion of the set of repetitions of the message according to the first format and the second portion of the set of repetitions of the message according to the second format.

27. An apparatus for wireless communication by a user equipment (UE), comprising:

a processor, memory coupled with the processor; and instructions stored in the memory and executable by the processor to cause the apparatus to:

receive, from a base station, an indication of a configuration for symbol repetition, the configuration comprising one or more parameters for transmitting a message on a physical uplink channel;

select a second format based at least in part on a number of bits supported by a first format indicated by the indication of the configuration;

format, based at least in part on the first format indicated by the indication of the configuration, a first portion of a set of repetitions of the message scheduled for transmission before a slot boundary, and based at least in part on a second format indicated by the indication of the configuration, a second portion of the set of repetitions of the message scheduled for transmission after the slot boundary, wherein the second portion of the set of repetitions is a single symbol, and wherein formatting the second portion of the set of repetitions is based at least in part on selecting the second format; and transmit, to the base station, the first portion of the set of repetitions formatted according to the first format and the second portion of the set of repetitions according to the second format.

28. An apparatus for wireless communication by a base station, comprising:

a processor, memory coupled with the processor; and instructions stored in the memory and executable by the processor to cause the apparatus to:

transmit, to a user equipment (UE), an indication of a configuration for symbol repetition, the configuration comprising one or more parameters for transmitting a message on a physical uplink channel;

indicate, via the indication of the configuration, a selection of a second format for the UE to use based at least in part on a number of bits supported by a first format indicated by the indication of the configuration;

receive, from the UE, a first portion of a set of repetitions of the message transmitted before a slot boundary and formatted according to the first format indicated by the indication of the configuration, and a second portion of the set of repetitions of the message transmitted after the slot boundary and formatted according to a second format indicated by the indication of the configuration, the second portion of the set of repetitions being a single symbol, and wherein the second portion of the set of repetitions is formatted based at least in part on selecting the second format; and process the first portion of the set of repetitions of the message according to the first format and the second portion of the set of repetitions of the message according to the second format.

* * * * *